(12) United States Patent
De Kievit et al.

(10) Patent No.: US 11,171,927 B2
(45) Date of Patent: Nov. 9, 2021

(54) METHOD FOR ENABLING ESTABLISHMENT OF A DIRECT CONNECTION

(71) Applicants: Koninklijke KPN N.V., The Hague (NL); Nederlandse Organisatie voor Toegepast-Natuurwetenschappelijk Onderzoek TNO, s-Gravenhage (NL)

(72) Inventors: Sander De Kievit, Leiden (NL); Antonius Norp, The Hague (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 185 days.

(21) Appl. No.: 15/769,671

(22) PCT Filed: Oct. 20, 2016

(86) PCT No.: PCT/EP2016/075267
§ 371 (c)(1),
(2) Date: Apr. 19, 2018

(87) PCT Pub. No.: WO2017/068062
PCT Pub. Date: Apr. 27, 2017

(65) Prior Publication Data
US 2018/0262500 A1    Sep. 13, 2018

(30) Foreign Application Priority Data
Oct. 22, 2015   (EP) .................................. 15191029

(51) Int. Cl.
*H04L 29/06* (2006.01)
*H04W 76/14* (2018.01)
(Continued)

(52) U.S. Cl.
CPC ........ *H04L 63/029* (2013.01); *H04L 63/0876* (2013.01); *H04L 63/101* (2013.01);
(Continued)

(58) Field of Classification Search
CPC . H04L 63/0876; H04L 63/029; H04L 63/101; H04W 76/14
See application file for complete search history.

(56) References Cited

U.S. PATENT DOCUMENTS 8,086,545 B2 * 12/2011 Vallinen ............. G06Q 30/0283
                                                        705/400
8,132,236 B2 *  3/2012 Hawkins ........... H04W 12/0609
                                                        726/4
(Continued)

FOREIGN PATENT DOCUMENTS

EP     2844021 A1    3/2015
WO  2016/083580 A1    6/2016

OTHER PUBLICATIONS

PCT Search Report and Written Opinion, PCT International Application No. PCT/EP2016/075267, dated Jan. 11, 2017, 13 pages.
(Continued)

*Primary Examiner* — Jeffrey C Pwu
*Assistant Examiner* — Rodman Alexander Mahmoudi
(74) *Attorney, Agent, or Firm* — McDonnell Boehnen Hulbert & Berghoff LLP

(57) ABSTRACT

Methods and systems are disclosed enabling establishment of a direct connection between a first device connected to a first network and a second device connected to a second network upon finding a permission response from a third
(Continued)

device connected to a third network. Establishment of the direct connection is controlled by a second network node associated with the second network. A connection request is received from the first device at at least one of the second network node or a third network node associated with the third network and a permission indication is found indicating that a connection with the second device is subject to permission from the third device. A permission response may be found from the third device to permit the connection request for enabling establishment of the direct connection. Establishing of the direct connection is enabled between the first device and the second device in response to finding the permission response.

18 Claims, 19 Drawing Sheets

(51) Int. Cl.
*H04W 12/084* (2021.01)
*H04W 12/088* (2021.01)
*H04W 76/23* (2018.01)

(52) U.S. Cl.
CPC ....... *H04W 12/084* (2021.01); *H04W 12/088* (2021.01); *H04W 76/14* (2018.02); *H04W 76/23* (2018.02)

(56) References Cited

U.S. PATENT DOCUMENTS

| | | | |
|---|---|---|---|
| 9,794,252 B2* | 10/2017 | Watanabe | H04W 12/06 |
| 2010/0009675 A1 | 1/2010 | Wijting et al. | |
| 2011/0258327 A1 | 10/2011 | Phan et al. | |
| 2012/0124660 A1* | 5/2012 | Wang | H04L 12/4641 726/12 |
| 2014/0165178 A1* | 6/2014 | Perrone, II | H04L 63/0892 726/9 |
| 2015/0236863 A1* | 8/2015 | Castro Castro | H04L 12/1407 370/259 |
| 2015/0347959 A1* | 12/2015 | Skaaksrud | G06Q 10/0833 705/333 |
| 2016/0337217 A1* | 11/2016 | Chan | G06N 7/005 |
| 2017/0078924 A1* | 3/2017 | Rydnell | H04W 36/0011 |

OTHER PUBLICATIONS

European Search Report, European Patent Application No. 15191029.6. dated May 3, 2016, 8 pages.
"3rd Generation Partnership Project; Technical Specification Group Services and System Aspects; Study on Enhancements for Infrastructure-Based Data Communication Between Devices (Release 13)", 3GPP TR 22.807 V13.0.0, Sep. 2014, pp. 1-22.
"3rd Generation Partnership Project; Technical Specification Group Services and System Aspects; Study on Extended Architecture Support for Proximity-Based Services (Release 13)", 3GPP TR 23.713 V0A.0, Feb. 2015, pp. 1-59.

* cited by examiner

METHOD FOR ENABLING ESTABLISHMENT OF A DIRECT CONNECTION

CROSS REFERENCE TO RELATED APPLICATIONS

The present application is a national stage entry of, and claims priority to, PCT/EP2016/075267, filed on Oct. 20, 2016, which claims priority to European Patent Application EP 15191029.6, filed in the European Patent Office on Oct. 22, 2015, both of which are hereby incorporated in their entirety herein by reference.

FIELD OF THE DISCLOSURE

The disclosure generally relates to the field of establishing direct connections between devices connected to different networks. More particularly, the disclosure relates to methods, systems, network nodes and user devices for enabling direct connections between such user devices upon permission of another user device.

BACKGROUND

In the future, communications between pairs of devices are likely to increase. Examples of such communications can be found in the increased application of connectivity of household devices such as game consoles, televisions, and heating systems as well as in the recent addition of tablet computers and smart phones. Some of these devices are capable of sending and receiving data over a direct data connection between them for a variety of purposes, such as e.g. using a smart phone or a tablet computer to control a television or a heating system, wirelessly transferring images and motion pictures from a camera to a laptop or a personal computer (PC), etc. Presently such communications are typically implemented by connecting both of the devices to the same network, such as a wired or wireless home or office network. Since this is not always possible or desirable, for data exchange between two devices that are not in the same network, the devices have to utilize an online service for relaying the data, which may also be undesirable at times.

Often, devices that would be advantageous to engage in a direct communication with one another without being connected to a common local network and without using an online service are devices connected to a cellular telecommunications network. A technique has been developed, known as "proximity services" or "direct mode", that enables a direct data connection between two cellular devices utilizing radio resources allocated for that purpose. Whereas conventional cellular devices utilize the network infrastructure of one or more telecommunications networks, the infrastructure comprising at least a base station to communicate with each other, a characteristic of direct mode communication between such devices is that they can establish direct wireless data connections with each other without the need for user data to traverse the network infrastructure.

It would be desirable to enable device-to-device (D2D) communication between two cellular devices which are not in the proximity of one another as is required by the direct mode communication described above and also not in the same local network. One factor that makes such communication difficult to achieve for cellular devices is that cellular devices might be subscribed to different mobile network operators and, therefore, be behind different firewalls. Even for devices that are in the same mobile operator network, security regulations might prevent that two devices communicate directly. A trivial solution to this problem would be to remove the firewalls and make every device addressable directly from both inside and outside the operator network. A problem that could then occur is that the operator, and, consequently, the user of the device, will not have control over the data that is allowed to reach the device. For example, a malicious website or hacker could then keep on sending data to certain devices, which could result in that the end users will be facing high bills for data usage or/and the network operator will not be able to charge for the unsolicited data, leading to a loss to the operator.

In an earlier application of the applicants, EP14195052.7 "Infrastructure-based D2D connection setup using OTT services", it was described how, in order for two software applications on two cellular devices to exchange data, the devices and the applications can be aware that a connection between the devices is available and that a device is aware that it should either expect data packets or can send data packets over this connection.

SUMMARY

The applicants have realized, however, that some user devices are non-operable by default (e.g. because the device does not have a user interface) or temporarily (e.g. because the device is remote and therefore cannot be operated at the desired time) and can, hence, not respond to a connection request for a direct connection. Examples of devices that are non-operable by default may include camera's, printers, household apparatus, measuring devices, medical devices, etc. The present disclosure aims to control direct connection between a first device (e.g. a mobile phone, a tablet computer, a smartwatch, a television apparatus etc.) connected to a first network and such an inoperable device connected to a second network from a third device of an owner of the inoperable devices, wherein the third device is connected to a third network.

To that end, one disclosed aspect pertains to a method for enabling establishment of a direct connection between a first device connected to a first network and a second device connected to a second network upon finding a permission response from a third device connected to a third network. The second device may be the non-operable device referred to above.

The establishment of the direct connection is controlled by at least a second network node (e.g. a second DMCC) associated with the second network.

In a first step, a connection request is received from the first device in the first network at at least one of the second network node or a third network node (e.g. a third DMCC) associated with the third network. The first network may have transmitted the connection request in response to receiving a connection request from the first device for a direct connection between the first device and the second device. The connection request may be received by a first network node in the first network.

A permission indication may then be found indicating that a connection with the second device is subject to permission from the third device. The permission indication may be stored in at least one of the second network node, the third network node, the second user device and the third user device.

A permission response from the third device may be received or stored in at least one of the first network node, the second network node or the third network node to permit the connection request for enabling establishment of the direct connection. In response to finding the permission response, establishing the direct connection is enabled between the first device and the second device.

Another disclosed aspect relates to a system for executing the methods disclosed herein, wherein the system comprises at least two network nodes of the first network node, the second network node and the third network node.

Yet other disclosed aspects relate to a computer program or suite of computer programs for performing the method, a non-transitory computer readable medium having a storage portion storing the computer program or part thereof, a network node (e.g. a Direct Mode Control Center (DMCC)) and a user device, e.g. the second user device as disclosed herein and the third device as disclosed herein.

Upon detecting the permission indication, the method enables finding a permission response in the system obtained from the third device. Accordingly, the owner of the third device may authorize (either prior to or after receiving the connection request from the first device) the establishment of the direct connection without a need to operate the second device. Hence, the second device does not require direct operation to establish the direct connection.

It should be appreciated that ownership in the context of this patent application may relate to having the (legal) authority to decide which incoming connections to an inoperable device are permitted and which connections are not. Often this will be the legal owner of the inoperable device, but it may also be another person mandated by the owner. E.g. in case of a device owned by a company, the authorization will probably be done by an employee of that company, or even somebody external, hired to do ICT management.

It should be noted that the first network, second network and third network may be network segments of a single network operated by a single operator. The first network node, second network node and the third network node may be logically separated parts of a single control node for each of the network segments.

In another example, the first network, second network and third network are networks of different operators, e.g. different mobile operators.

It should be noted that the permission response may be considered to constitute a permission indication, since the permission response indicating the permission to establish the direct connection may be considered to indicate that establishment of the direct connection between the first device and the second device is subject to permission by another device.

In one embodiment, the second device is one of a plurality of devices, wherein for each device in the plurality of devices a permission indication and a permission response is found. Prior to enabling the direct connection the method comprises transmitting a list comprising the plurality of devices to the first device. The method further comprises receiving a selection message comprising an identifier of the second device from the first device and establishing the direct connection between the first device and the second device on the basis of the identifier. The embodiment enables that a user requesting the connection may choose to which device he or she connects if a permission response is found for more than one device.

In one disclosed embodiment, a permission request is transmitted to the third device from or via at least one of the second network node and the third network node. The permission request may be triggered by finding the permission indication that establishment of the direct connection with the second device is subject to permission from the third device.

A permission response is received from the third device at at least one of the second network node and the third network node to permit the connection request for enabling establishment of the connection.

The direct connection between the first device and the second device is enabled in response to receiving the permission response.

The embodiment enables tracing the third device and request permission to enable establishment of the direct connection between the first device and the second device from the traced third device in response to receiving the connection request from the first device.

In one embodiment, the second device is one of a plurality of devices, wherein for each device in the plurality of devices a permission indication is found. The method further comprises transmitting a list comprising the plurality of devices to the third device. The method further comprises receiving a selection message comprising an identifier of the second device from the third device and establishing the direct connection between the first device and the second device on the basis of the identifier. The embodiment enables that if an owner owns a plurality of devices, the owner may choose to which device the user of the first device may connect.

In one disclosed embodiment, wherein a first network node is associated with the first network, at least one of the first network node, the second network node and the third network node enables establishment of the direct connection between the first device and the second device by configuring at least one firewall, protecting at least one of the first device and the second device, for a data exchange between the first device and the second device over the first network and the second network. Firewalls, e.g. edge firewalls, protect devices on opposite sides of the firewall by preventing establishment of direct connections and need to be configured to enable establishment of such direct connections.

In one disclosed embodiment, a first network node is associated with the first network and the method is performed at the third network node, e.g. the third DMCC. The third network node receives the connection request for establishment of the direct connection between the first device and the second device from the first network node and recognizes information in the connection request from the first network node indicative of the permission indication. The information in the connection request indicative of the permission indication may comprise an identifier of the second device in the second network or an identifier of the second device in the third network.

The permission request is transmitted to the third device in response to receiving the connection request upon finding the permission indication. In response to receiving the permission response from the third device, the third network node instructs at least one of the first network node and the second network node to enable establishment of the direct connection between the first device and the second device.

The embodiment enables the third network node to control directing the permission request to the third device. The first network node directs the connection request to the third network node instead of to the second network node as one would expect for establishing a connection with the second device. The embodiment enables execution of the method, even in the case that the second network node is not configured to find a permission indication indicating that a connection with the second device is subject to permission from the third device.

In one disclosed embodiment, the instruction from the third network node is received at the first network node to enable establishment of the direct connection. In response thereto, the first network node transmits the connection request to the second network node to establish the connection between the first device and the second device.

In one disclosed embodiment, the second network node performs the following steps. The second network node receives the connection request from the first device (e.g. via the first network node) to establish the direct connection between the first device and the second device. The permission request is transmitted from the second network node to the third network node in response to finding a permission indication accessible at the second network node.

In one embodiment, the permission indication may be stored upon instruction from the third device via the third network node. In another embodiment, the permission indication may be set from e.g. a web service associated with the second network node.

In one embodiment, the permission indication may comprise an identifier of the second device in the third network generated e.g. by the third network node.

The second network node may receive a permission response of the third device from the third network node. The direct connection may then be established between the first device and the second device.

The embodiment enables the second network node to control directing the permission request to the third device via the third network node. This embodiment may be advantageous in situations wherein the second device is owned by a party subscribed to the second network and hence prefers control to be executed in the second network. In an example wherein the second device is an electricity metering device and the party is a metering company, it may be convenient to store parameters regarding the metering device, such as historical energy readings and permission indications, in the second network node, since the metering company is in the second network.

In one disclosed embodiment, the third network node operates as a relay node between the first device and the second network node during the existence of the direct connection between the first device and the second device. The embodiment enables the third device to control the direct connection between the first device and the second device by control signals from the third device received at the third network node.

In one embodiment, a termination signal from the third device may be received at the third network node that terminates the direct connection between the first device and the second device.

In one disclosed embodiment, the method is performed at the second device. The second device receives the connection request via the second network node and, automatically, transmits a permission request to the second network node upon finding a permission indication stored in the second device. The permission response of the third device is received from the second network node (that, in turn, received the permission response from the third network node) to enable establishment of the direct connection between the first device and the second device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
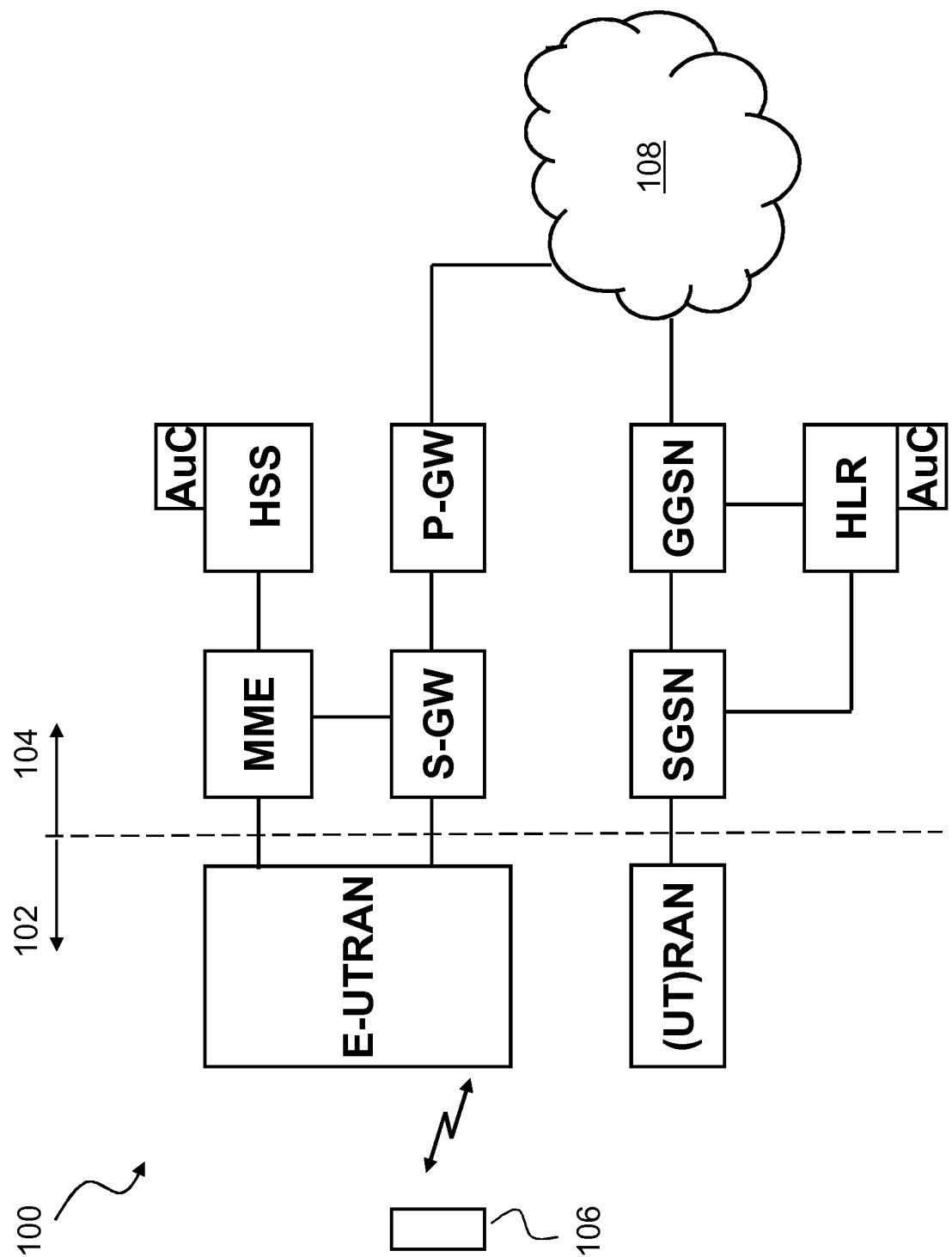
FIG. 1 shows a schematic illustration of a telecommunications system.

FIG. 1 shows a schematic illustration of a telecommunications system 100. The telecommunications system 100 comprises a radio access network 102 (also indicated as E-UTRAN or (UT)RAN in FIG. 1) and a core network 104 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network.

For a GSM/GPRS telecommunications network (i.e., a 2G/2.5G telecommunications network), a radio access network 102 comprises a plurality of base stations (BTSs) and one or more Base Station Controllers (BSCs), not shown individually in FIG. 1. The core network 104 comprises a Gateway GPRS Support Node (GGSN), a Serving GPRS Support Node (SGSN, for GPRS) or Mobile Switching Centre (MSC, for GSM, not shown in FIG. 1), and a Home Location Register (HLR) combined with an Authentication Centre (AuC). The HLR contains subscription information for mobile devices 106 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 102 comprises a Radio Network Controller (RNC) connected to a plurality of NodeBs, also not shown. In the core network 104, the GGSN and the SGSN/MSC are conventionally connected to the HLR/AuC that contains subscription information and shared secret keys K of the mobile devices 106.

The upper branch in FIG. 1 represents a Long Term Evolution (LTE) system or Evolved Packet System (EPS) (i.e., a 4G telecommunications network). In such a network, the radio access network 102, indicated as E-UTRAN, comprises evolved NodeBs (eNodeBs or eNBs) providing wireless access for the mobile devices 106. The core network 104 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of an EPS network can be found in 3GPP TS 23.401.

For GPRS, UMTS and LTE telecommunications network, the core network 104 is generally connected, using e.g. a gateway (e.g. the P-GW), to a further network 108 which could be any external packet switched network such as e.g. Internet or a dedicated network to provide connectivity between different operators.

Of course, architectures other than defined by 3GGP, e.g. WiMAX and/or CDMA2000, can also be used within the context of the present disclosure and this does not preclude future architectures such as 5G.

Figure 2A:
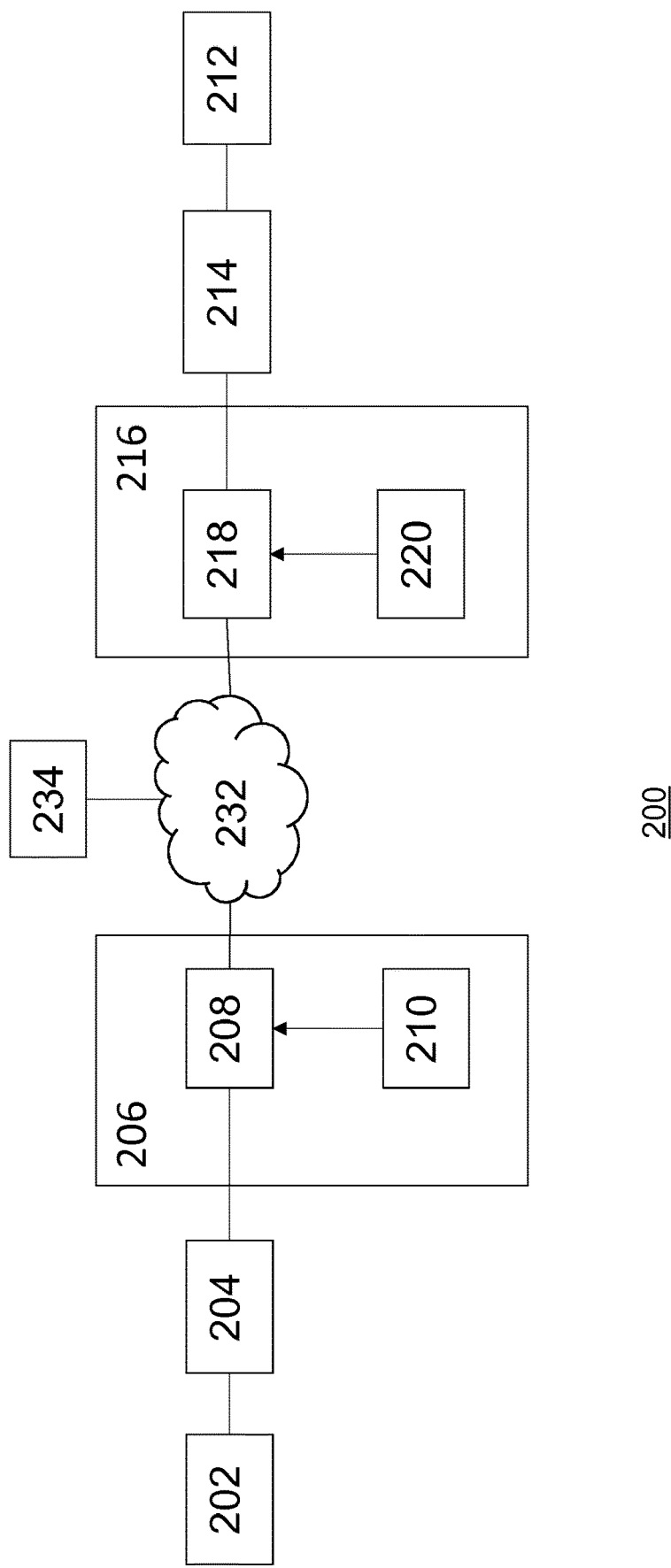
FIGS. 2A and 2B provide a schematic illustration of a system and messaging diagram that enables establishment of an infrastructure-based D2D connection between two devices as described in a previous application of the applicants.

FIG. 2A provides a schematic illustration of a system 200, described in previous application of the applicants EP14195052.7 "Infrastructure-based D2D connection setup using OTT services". The system enables establishment of an infrastructure-based D2D connection between two devices 202, 212 running the same, or compatible, OTT application. For illustrative purposes, consider that the OTT application running on both devices is Facebook. Further consider that the end-user of the first device 202, Mary, is friends on Facebook with the end-user of the second device 212, John, and that Mary would like to send a picture to John using infrastructure-based D2D communication. The system 200 allows Mary to select John on her device (e.g., a smart phone) and select to send a picture. The system 200 allows John to accept the request, as a result of which a connection may be set up between the devices of Mary and John. The picture may be sent over this connection and the connection may be released again.

Other example applications of infrastructure based D2D communications may include: two end-users playing a user-to-user game on their respective devices, sending business cards from one end-user to another end-user, remote control of a device (e.g. an appliance) from another device (e.g. a smart phone), a device (e.g. a sensor) sending an alarm to another device, or a device (e.g. a tablet-PC) sending a print job to another device (e.g. a printer).

As shown in FIG. 2A, the system 200 includes a first mobile device 202 (Mary's device in the scenario described above) connected to a telecommunications network, referred to hereafter as a "first telecommunications network", of a first mobile network operator A, which is shown in FIG. 2A with the device 202 being connected to a radio access network 204 of the first telecommunications network. The radio access network 204 is, in turn, connected to a core network 206 of the first telecommunications network as shown in more detail in FIG. 1. Similarly, the system 200 includes a second mobile device 212 (John's device in the scenario described above) connected to a telecommunications network, referred to hereafter as a "second telecommunications network", of a second mobile network operator B, which is shown in FIG. 2A with the device 212 being connected to a radio access network 214 of the second telecommunications network. The radio access network 214 is, in turn, connected to a core network 216 of the second telecommunications network.

Each of the radio access networks 204 and 214 could be one of the radio access networks 102 illustrated in FIG. 1, while each of the core networks 206 and 216 could be one of the core networks 104 illustrated in FIG. 1. Each of the mobile devices 202 and 212 could be the mobile device 106 illustrated in FIG. 1, connected to its respective network 100. Further, similar to the architecture illustrated in FIG. 1, the core networks 206 and 216 are connected to a further network 232, which, like the further network 108 shown in FIG. 1 could be any external packet switched network such as e.g. Internet or a dedicated network to provide connectivity between different MNOs. A server of an OTT service provider 234, such as e.g. Facebook, is connected to the Internet 232.

As further shown in FIG. 2A, the core network 206 under the control of the MNO A includes an edge firewall 208. Similarly, the core network 216 under the control of the MNO B includes an edge firewall 218.

The edge firewalls 208 and 218 are components that aim to ensure that the network and the devices behind those firewalls are protected against cyber attacks, such as port scans, login attempts, etc., where the "network" can include any of the networks of the operator, ranging from operational cellular networks including devices of its subscribers to office networks and other networks without subscribers. The firewalls 208 and 218 therefore also protect the subscribers from unsolicited data. Effectively the firewalls 208 and 218 block any communication to the respective subscriber's device (the first and second devices, respectively) if the device did not initiate these communications itself. In other words, the firewalls prevent incoming connections to the devices. Therefore, these are the firewalls that need to be reconfigured if a device protected by or, as said in the art, is 'behind' such a firewall would like to receive connections from another device not behind the same firewall. In some cases, this may even apply for two devices that are behind the same firewall. For example, routing protocols within the same network may still enforce that any traffic between two devices behind the same firewall has to pass through that firewall, giving the firewall the possibility to disallow such traffic. In such cases, the protecting firewall would need to be reconfigured to allow these two devices to directly connect to one another.

In mobile telecommunications networks, firewall functionality is sometimes performed inside the P-GW of a network. Therefore, according to embodiments of the present application, what is referred to as a "firewall" is to be understood to, possibly, also comprise a P-GW or be a combination of a firewall and a P-GW.

Furthermore, in some networks, a networking device may be employed that translates between public IP addresses and IP addresses internal to the network, called private IP addresses. Such a translation is known in the art as Network Address Translation or "NAT" and can be performed by a firewall. In common networking technology a device that is both translating addresses and working as a firewall is called a NAT'ing firewall. One or both of the firewalls 208 and 218 could comprise such NAT'ing firewalls.

As also shown in FIG. 2A, the core network 206 under the control of the MNO A further includes a first network node 210, e.g. a first routing entity. Similarly, the core network 216 under the control of the MNO B further includes a second network node 220, e.g. a second routing entity.

Each of the first and second network nodes 210 and 220 could be implemented on a Direct Mode Control Center (DMCC). However, the DMCC could also be implemented together with another mobile network core control type functionality such as the MME or the Call Session Control Function—CSCF (IMS control). Alternatively, the DMCC could be a separate control function in the mobile network.

A DMCC as described herein may be a device implementing a ProSe Function and comprising a ProSe Application Server. As known in the art, a ProSe Function is a control function for enabling direct communication between UEs. As described in TS 23.303 of 3GPP, such a ProSe Function may provide the UEs with the necessary parameters in order to use ProSe Direct Discovery and ProSe Direct Communication, where the word "Direct" refers to a direct radio link between the discovered or communicating ProSe-enabled UEs. The ProSe Function may be configured to keep track of the mapping of ProSe Application IDs and ProSe Application Codes used in the ProSe Direct Discovery, where the "Application IDs" refer to a globally unique identifier identifying application-related information for the ProSe-enabled UE and the "Codes" refer to the codes that are associated with the ProSe Application IDs and are used for the discovery process. In the context of the present application, "Applications" refer to applications installed on the mobile operating system, such as a printer driver, a game, an application for home (security) control, and application to control a car, an application to remotely control a device, a social networking application (LinkedIn, Facebook), etc. The ProSe Function may further be configured to provide the UEs with the necessary radio or network parameters and security material for discovery and communication, handle and maintain a registry of the user application identifiers and subscribers, maintain a registry of applications that are authorized to use ProSe discovery services, etc. Furthermore, the ProSe Function may include methods and functions for detecting proximity of two UEs and/or communicating proximity of two UEs with other operators' ProSe Functions.

The ProSe Application Server may keep a registry of EPC ProSe User IDs and ProSe Function IDs and be configured to map the Application Layer User ID and EPC ProSe User ID. The EPC ProSe User ID may, for example, be an identifier that the UE can broadcast or listen for on a radio channel such as a wireless local area network (WLAN). The ProSe Function ID refers to a ProSe Function in the operator's network.

Still further, the ProSe Function may be configured to inform UEs when a particular direct mode device is nearby another direct mode device and a request for direct communication by any of these devices is received. Upon such a request, the ProSe Function may cooperate with the ProSe Application Server and the application to provide the UE with a list of friends who are nearby. As used herein, the term 'friends' refers to any list of friends that e.g. the subscriber has provided to the ProSe Function to query the application service for.

Herein, the application server or services (e.g. an application) are referred to as "over the top services" or "OTT services".

The DMCCs 210 and 220 may be further extended to control the edge firewalls 208 and 218, respectively. By adding a signalling channel between the mobile devices and the respective DMCC, better control over the holes in the firewall may be achieved, leading to added security compared to uncontrolled firewall hole punching techniques.

In case the first and second devices 202, 212 are connected to the same telecommunications network of a single MNO, the DMCCs 210 and 220 may be implemented as a single DMCC. Of course, in various embodiments functionality of the DMCCs 210 and 220 may be combined or distributed over any number of logical devices.

In case IP traffic always originates from device 202, there may be no need to control the edge firewall 208 as the firewall can be automatically opened for responses from device 212 on outgoing IP packets from device 202. In that case, also DMCC 210 may be omitted from the core network 206.

Figure 2B:
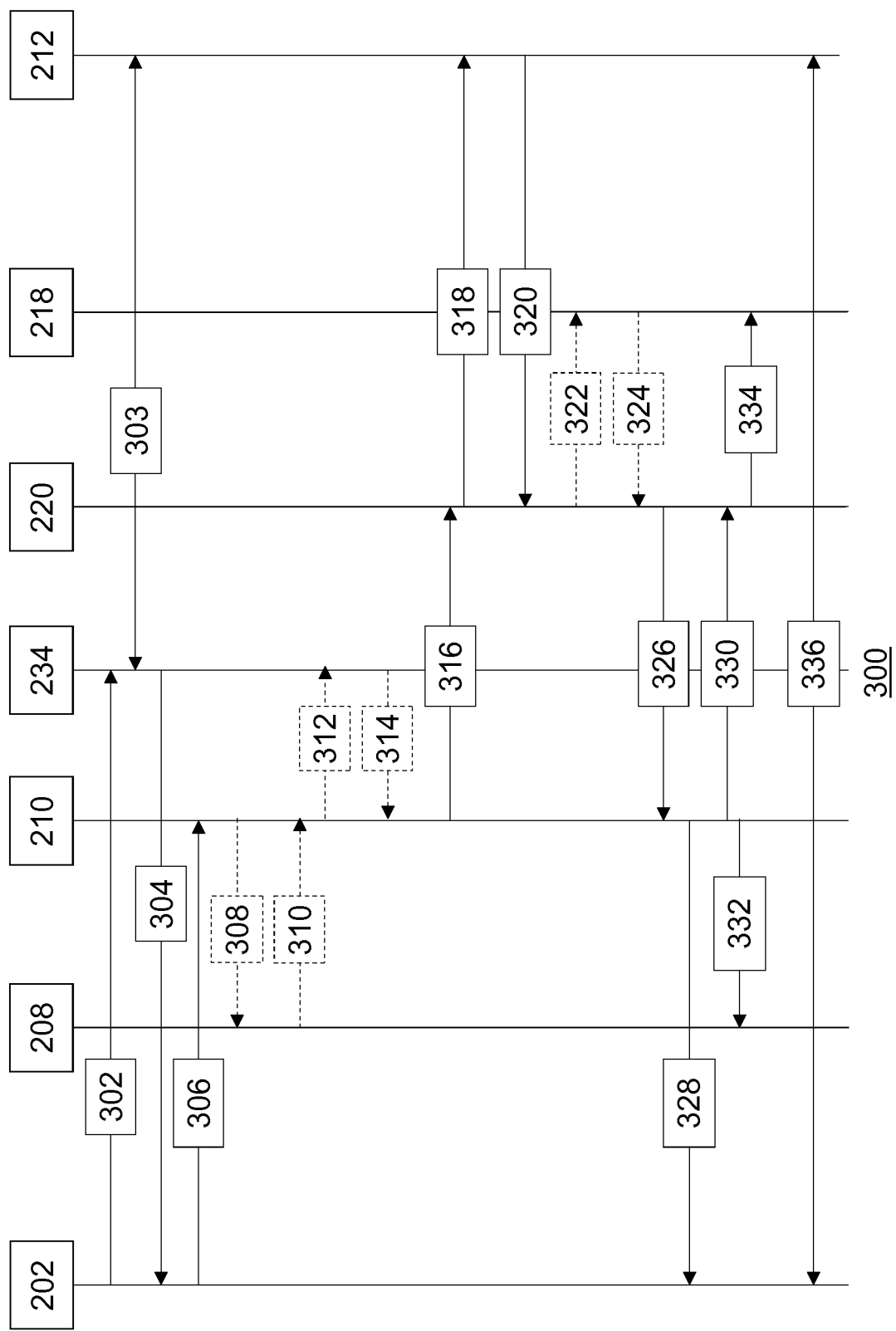

FIG. 2B illustrates a messaging diagram for a method 300 of setting up an infrastructure-based D2D connection between the first device 202 and the second device 212.

The first device 202 may comprise a user interface that allows the user (i.e., Mary) to indicate that the user of the first device 202 would like to send data, e.g. a picture, to a user of another mobile device, e.g. to the second device 212 of John, using infrastructure-based D2D communication between the first and second devices 202, 212. Mary and John are known to the first and second devices 202, 212 to be connected on an OTT application, e.g. to be "friends" on Facebook or on a game server.

In response to receiving user input indicative of Mary's desire to send data to John in this manner, the first device 202 may request the OTT service provider 234, in step 302 shown in FIG. 2B, for a first identifier of the second device 212. If the OTT service provider 234 is not in the possession of the first identifier for the second device 212, the OTT service provider 234 will request such an identifier from the second device 212 in a procedure shown with step 303. Step 303 may be omitted if the OTT service provider 234 is aware of the first identifier of the second device 212, e.g. because the second device 212 already provided its first identifier to the OTT service provider 234, e.g. using an earlier procedure 303.

In step 304, the OTT service provider 234 replies to the first device 202 with the first identifier of the second device 212. Such an identifier could be a phone number or another identifier as long as the first DMCC 210 is able to resolve the identifier to the MNO B. For example, device2@mno-b.countrycode could be an example of such an identifier. Optionally, a first identifier could also include more information, such as the application that it is for—e.g. facebook.device2@mno-b.countrycode, or the specific peer e.g. device-a.facebook.device2@mno-b.countrycode.

Optionally, the first device 202 may be configured to store the first identifier obtained from the OTT service provider 234 for any period of time, to be used later without the need to perform step 304 again.

The first device 202 then forwards the first identifier of the second device to the DMCC 210 in message 306. In that message, optionally, the first device 202 may also include separate information indicating the application used (e.g. an application identifier). Furthermore, the first device 202 may also include the IP address and port number that the first device intends to use for the communication. If that is the case, then the DMCC 210 may check whether the received IP address is a public IP address. If not, the DMCC 210 may obtain a public IP address and port number that can be used for the communication session of the first device 202, e.g. by querying the firewall 208 and/or another firewall of the first telecommunications network, as shown with a step 308. The IP address and port number that are returned to the DMCC 210 in step 310 may form at least a part of the contact information of the first device 202 to be used for the infrastructure-based D2D communication.

In alternative embodiments, the first device 202 may provide the IP address and port number that the first device intends to use in a message separate from the message 306 and/or at any point in time that is earlier or later than the message 306.

In another alternative embodiment, the first device 202 may let the first DMCC 210 handle the communication with the OTT service 234. In such an embodiment, the order and the endpoints of the messages 302, 304 and 306 may change as follows. The first device will first send a single message that contains the information from the messages 302 and 306, except for the first identifier, to the DMCC 210. The DMCC 210 will then send the message 302 to the OTT service and the OTT service will reply with the message 304 to the DMCC 210. In this manner, effectively, the DMCC 210 can handle the communication with the OTT service on behalf of the first device 202.

In response to receiving the first identifier of the second device 212 from the first device 202, the DMCC 210 may check whether it can resolve the first identifier to a second identifier to identify a specific MNO (i.e., to the MNO of the second device 212) so that the MNO/DMCC of the second device can be contacted). Thus, the second identifier allows identification of the second device and at least a part of the second identifier (e.g., a domain name, mobile network code, or country code) can be used to contact the second DMCC 220 of the second device 212 by means of knowing to which MNO the second device 212 belongs to. The exact procedures to contact a specific DMCC 220 depend on the type information used in the at least part of the second identifier and are known to the persons skilled in the art. For that purpose, in various embodiments, the first DMCC 210 could interact with the OTT service provider 234 to resolve the first identifier into a second identifier, interact with public databases, such as a domain name server (DNS), or interact with databases accessible by at least MNOs A and B (e.g. an infrastructure DNS, or the HLR of the MNO B).

For example, in one embodiment, the first DMCC 210 can resolve the first identifier because the first identifier contains all the relevant bits for the second identifier. In this case, the DMCC 210 can construct the second identifier using some logic known to the DMCC 210, by removing or adding parts or by querying databases that MNOs A and B share between each other, such as e.g. an HLR Lookup query.

In another embodiment, in case that the first identifier does not contain all of the relevant bits for the second identifier, the first DMCC 210 may be configured to query the OTT service provider 234 for the second identifier, as shown in FIG. 2B with a query message 312. A response of the OTT service provider with the second identifier, or information that then allows the DMCC 210 to determine the second identifier, is shown in FIG. 2B with a message 314.

Once the first DMCC 210 has successfully resolved the first identifier to the second identifier, then, having identified the MNO B, the first DMCC 210 can identify the second DMCC 220 of the second device 212 and, in step 316, the first DMCC 210 can send a message 316 to the second DMCC 220 of MNO B with a connection request for the second device 212, using the resolved second identifier. The connection request may comprise the first and/or second identifier, and optionally may include an identifier and/or contact information for the first device and/or an indication of the application used (e.g. an application identifier). In case device 202 was previously authenticated with network 206, DMCC 220 can trust that the identifier for device 202 in message 316 is checked to be correct by DMCC 210.

The second DMCC 220 may then check for validity of the second identifier of the second device 212, check whether the second device 212 is within reach and if so, whether it is roaming. The DMCC 220 may then resolve the first and/or second identifier received in the connection request to a third identifier, e.g. by using its own database of identifiers. The second DMCC 220 may then send a message 318 to the second device 212 with the connection request from the first device 202. Depending on the configuration, the second device 212 may comprise a user interface for displaying the received connection request to the user, possibly inside the specific OTT application if an indication of the application used is provided either as part of the first identifier or added as a separate information element in message 318 or another message, and for receiving user input as to whether or not to accept the request. The second device 212 may then reply to the second DMCC 220 with a message 320 indicating to the DMCC 220 that the connection request has been accepted or rejected. Either in that or in a separate message the second device 212 could also include the IP address and port number that the second device 212 intends to use for the infrastructure-based D2D communication with the first device 202.

Assuming that the second device 212 has accepted the connection request, upon the receipt of message 320 indicating the acceptance, the second DMCC 220 may check whether the received contact information of the second device 212 is a public IP address. If not, the DMCC 220 may obtain a public IP address and port number for the communication e.g. by querying the firewall 218. To that end, as shown in FIG. 2B, the DMCC 220 may send the received IP address and port number of the second device to the firewall 218 in a message 322. The firewall 218 may create a NAT rule, select a port number for the NAT, and provide its external IP address and selected port number back to the DMCC 220 in a message 324. The external IP address and the selected port number then form the "contact information" for the second device that the first device should use when setting up the TCP/IP session.

In step 326, the second DMCC 220 informs the first DMCC 210 that the connection is agreed. In that step or in a separate message, the DMCC 220 may include the contact information for the second device 212.

While in present-day networks the contact information is typically an IP address and port number that devices can use to contact one another, embodiments of the present invention are equally applicable to any other types of contact information that allows devices to contact one another. For example in IPv6 networks, one might provide a range of IP addresses or a list IP address.

The first DMCC 210 forwards the connection accept message including the contact information of the second device to the first device, as shown with a message 328 and, as shown with a message 330, if it has not done so already e.g. in the message 316 described above or in a separate message, informs the DMCC 220 which contact information the first device will be using to contact the second device. The DMCC 210 also informs the firewall 208, in a message 332, that the connection between the first device 202 and second device 212 will be setup soon so that the firewall can configure accordingly.

In step 334, the second DMCC 220 informs the firewall 218 to expect incoming traffic from the first device 202 to the second device 212 according to the specified contact information, so that the firewall 218 can be configured accordingly.

Once the firewalls 208 and 218 have been properly configured in accordance with the contact information of the first and second devices, in step 336 a TCP/IP-session connection setup from the first to the second device may take place and the first device may then send data to the second device, and vice versa, over the TCP connection that was set up. Alternatively, step 336 may comprise the first device and second device exchanging data using a stateless protocol, such as e.g. UDP, which does not need to set up a connection before exchanging data.

In FIGS. 2A-2B, the second device 212 is configured for accepting or denying the connection request from the first device 202 in step 320.

Figure 3A:
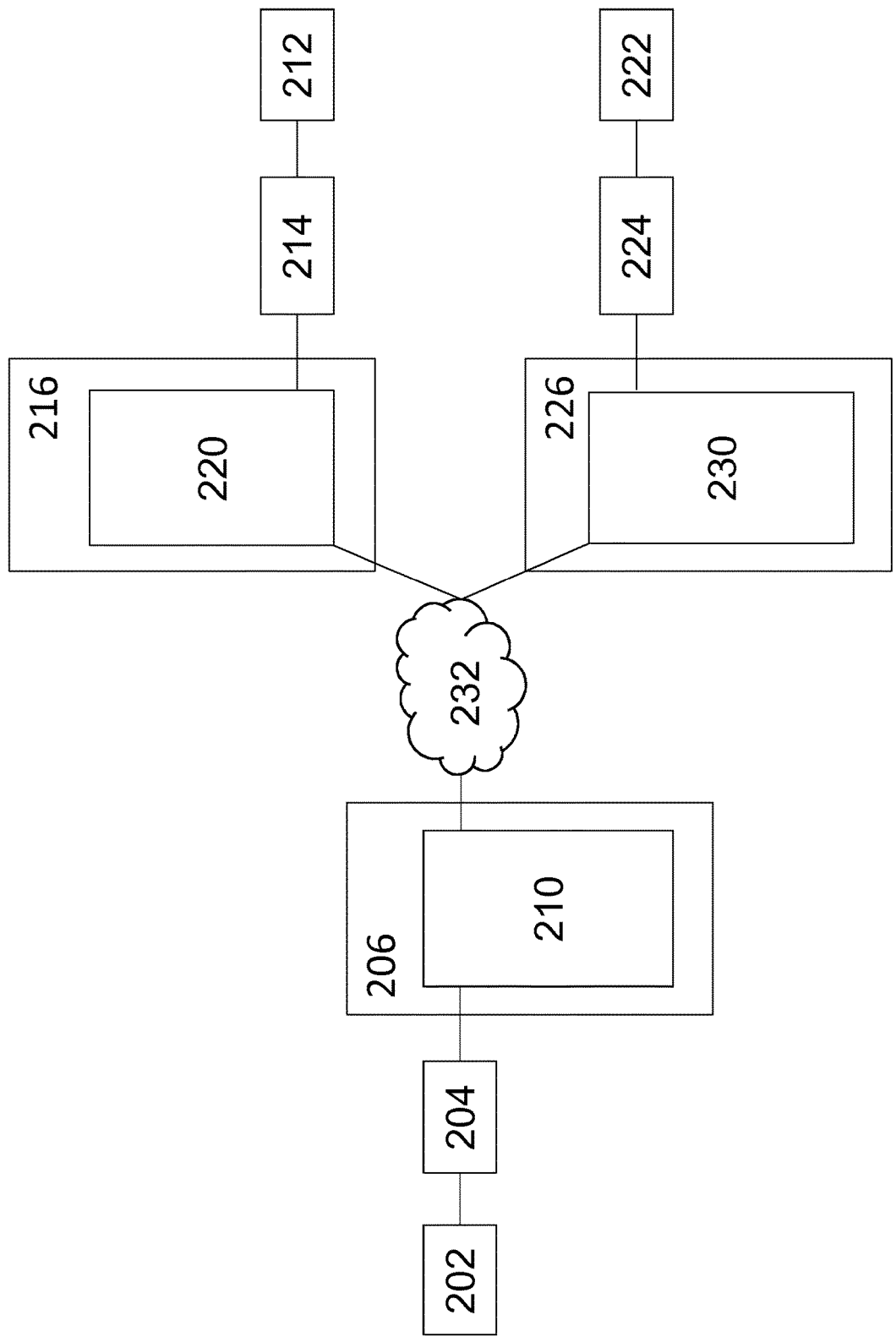
FIGS. 3A-3D provide a schematic illustration of a system and messaging diagrams that enables establishment of a direct connection between a first device and a second device according to a disclosed embodiment.

FIG. 3A provides a schematic illustration of a system 400 that enables establishment of a direct connection between a first device 202 and a second device 212, wherein device 212 is non-operable by a user, for example because the device does not comprise a user interface. Note that several components in FIG. 3A have identical reference numbers as components in FIG. 2A and have already been described above.

With respect to system 200 depicted in FIG. 2A, system 400 comprises an additional third device 222. The third device 222 is connected to a third radio access network 224 of a third mobile network operator C. Radio access network 224 could be one of the radio access networks 102 illustrated in FIG. 1 and is connected to a third core network 226, wherein core network 226 could be one of the core networks 104 illustrated in FIG. 1. Device 222 could be the mobile device 106 illustrated in FIG. 1, connected to its respective network 100. Third core network 226 comprises a third network node 230, which could be implemented on a DMCC, similar to the first and second network nodes 210 and 220. Note that core network 226 is connected to the further network 232, similar to the core networks 206 and 216. Also note that in contrast to the system 200 in FIG. 2A, the system 400 may not comprise any firewalls.

It should be appreciated that core networks 206, 216 and 226 may refer to the same core network, controlled by one mobile network operator, i.e. mobile network operator A, B and C refer to the same mobile network operator. It may also be that two of the core networks 206, 216 and 226 refer to the same core network of one mobile network operator, while the remaining core network refers to a separate core network of a different mobile network operator.

One or more of the core networks 206, 216, 226 may contain an edge firewall.

Figure 3B:
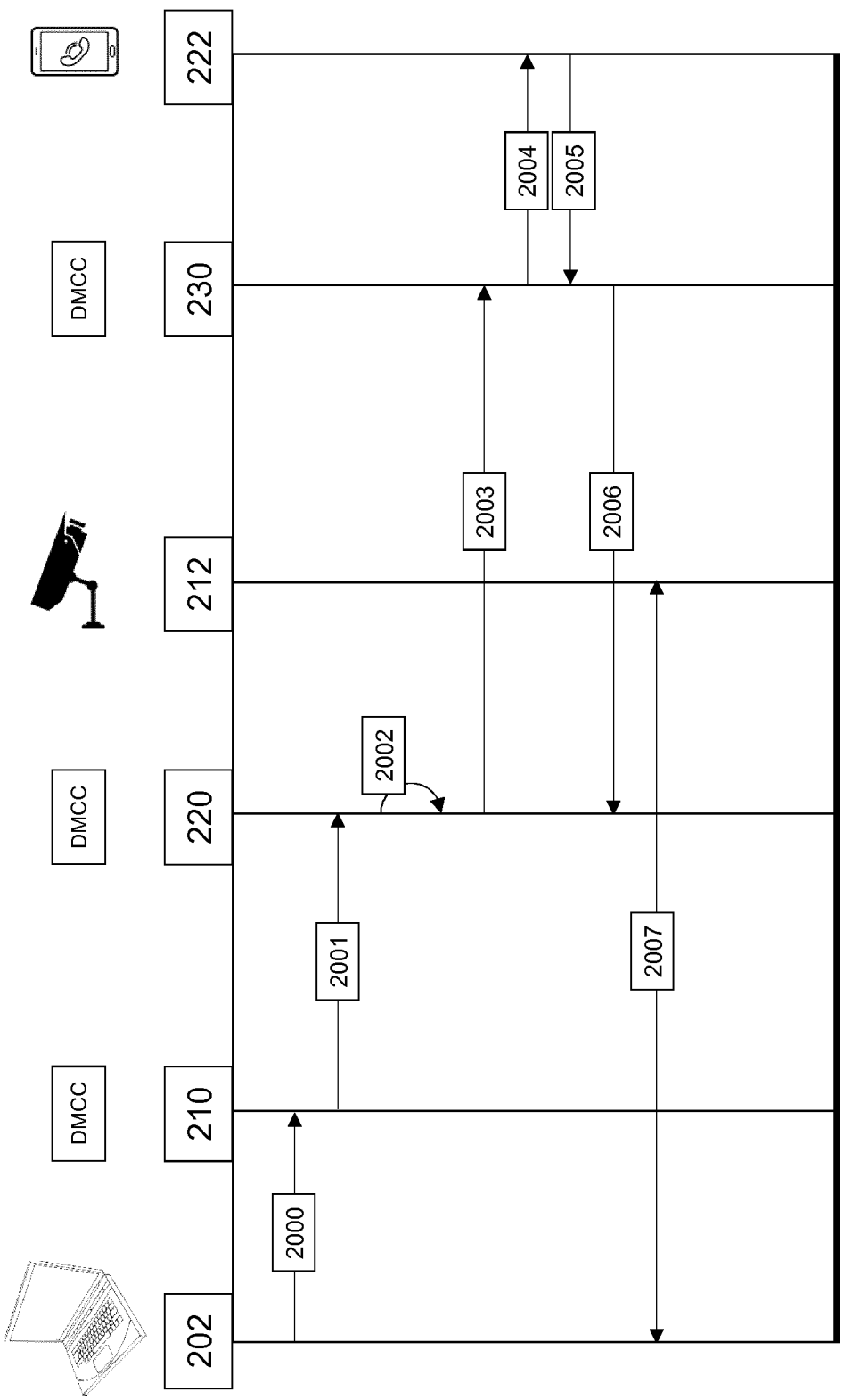

FIG. 3B is a message diagram according to an embodiment of the invention performed within system 400 depicted in FIG. 3A. For illustrative purposes, consider first device 202 to be a notebook computer, second device 212 a remote security camera, and the third device 222 a mobile phone of a user that owns the security camera 212. Other examples of trios of devices may be a camera 202, a printer 212 and a tablet 222, or an application server 202, a medical device 212 and a laptop 222, or an application server 202, an energy metering device 212 and a tablet 222. Further assume that the first 210, second 220 and third 230 network nodes are DMCCs associated with the first 206, second 216 and third 226 core networks respectively. In an example a user of notebook computer 202 wishes to set up a direct connection between the notebook 202 and security camera 212 so that a video stream recorded by the camera 212 can be displayed on the notebook computer 202. The security camera 212 in this example is remote from its owner, so that a connection request should be routed through mobile phone 222 of the owner of security camera 212.

In a first step 2000 the notebook 202 sends to the DMCC 210 a connection request for a direct connection between notebook 202 and security camera 212. In step 2001 DMCC 220 receives the connection request from DMCC 210 and finds a permission indication in step 2002 indicating that a connection with the security camera 212 is subject to permission from mobile phone 222. Then, in steps 2003 and 2004, the DMCC 220 sends a permission request to the mobile phone 222 via DMCC 230. The user of the mobile phone 222 approves the direct connection, and DMCC 230 receives in step 2005 the permission response from the mobile phone 222. In step 2006, DMCC 220 receives from DMCC 230 the permission response and in step 2007 the direct connection between the security camera 212 and the notebook 202 is established. Establishment of the direct connection may be obtained in a manner similar as described with reference to FIGS. 2A-2B.

Figure 3C:
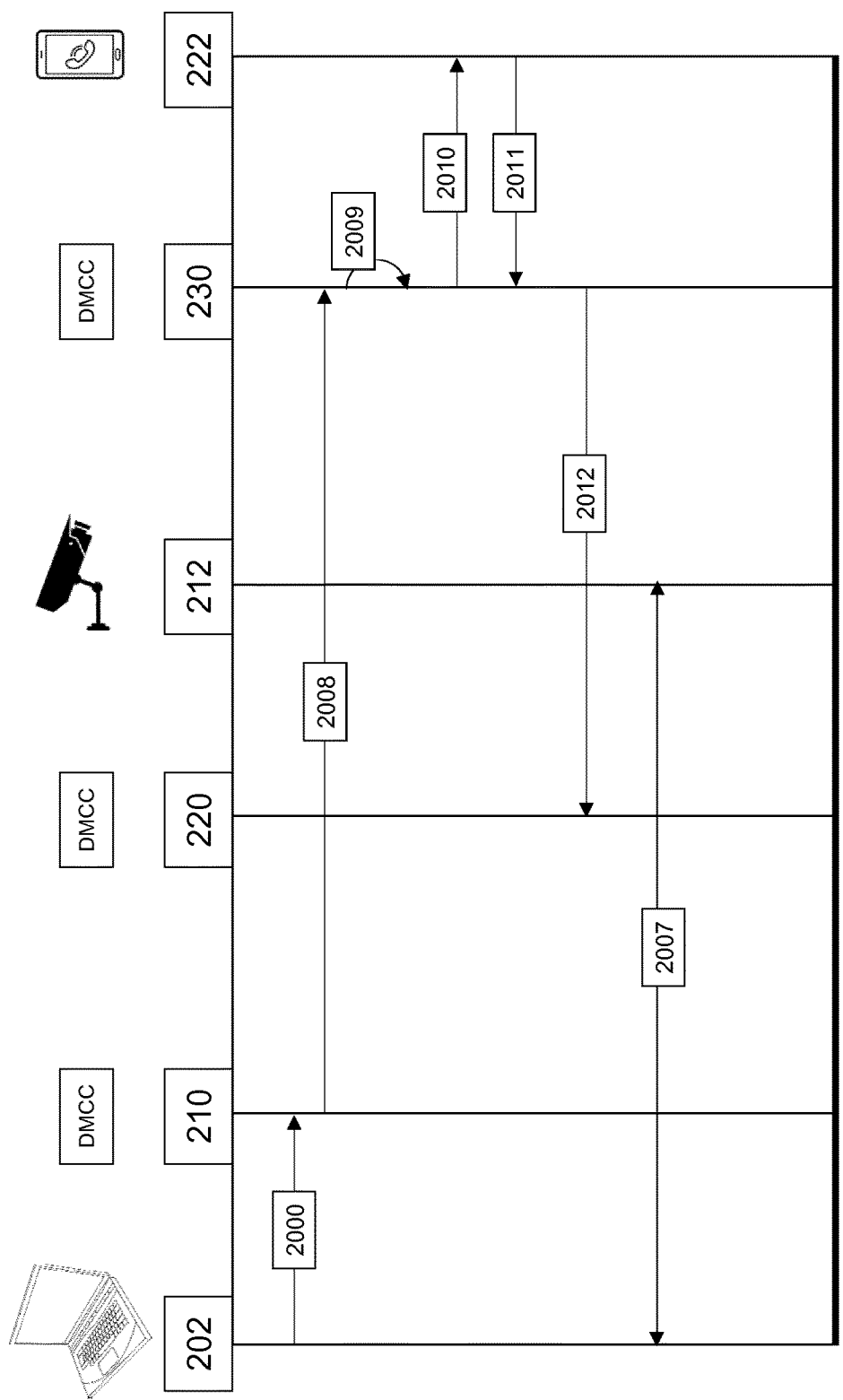

FIG. 3C shows another embodiment of the invention within system 400 of FIG. 3A. Again, in a step 2000, the notebook sends a connection request to DMCC 210. DMCC 210 in this embodiment routes the connection request not to DMCC 220, but to DMCC 230, based on an indication that connection requests for security camera 212 should be routed to DMCC 230. Thus, in step 2008, DMCC 230 receives from DMCC 210 the connection request. Subsequently, in step 2009 DMCC 230 finds a permission indication that a connection with the security camera 212 is subject to permission from mobile phone 222, and sends in step 2010 a permission request to mobile phone 222. Again, the user of mobile phone 222, who is also the owner of security camera 212, approves the request and in step 2011 the DMCC 230 receives from mobile phone 222 a permission response. Upon receiving the permission response DMCC 230 enables establishment of the direct connection by instructing DMCC 220 to set up the direct connection in step 2012. Similar to the previous embodiment, in a step 2007, the direct connection between notebook computer 202 and security camera 212 is established.

Figure 3D:
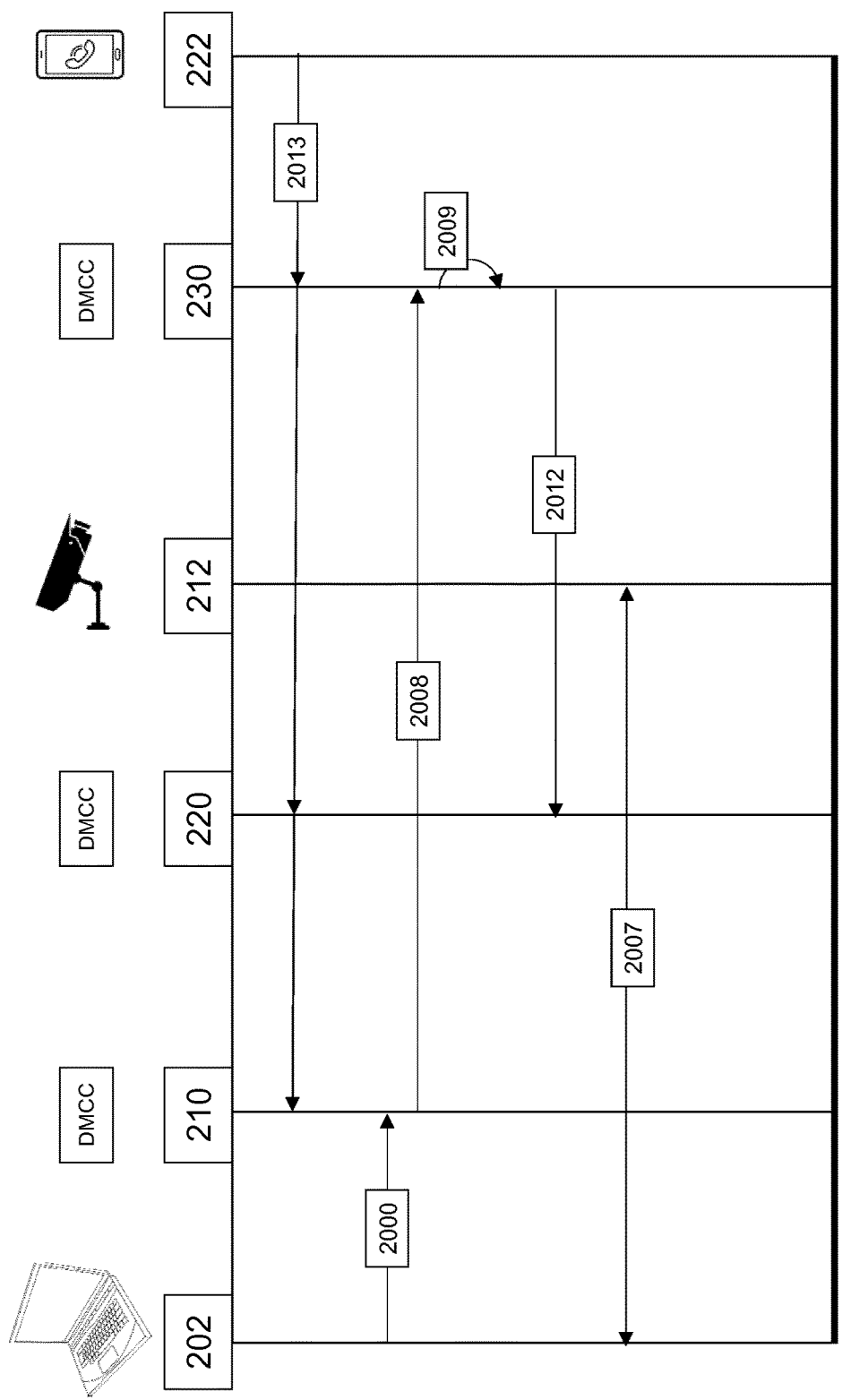

FIG. 3D shows yet another embodiment of a messaging diagram in the system 400 of FIG. 3A. Prior to receiving a connection request in step 2000, a permission response is received in step 2013 from the mobile device 222 owning security camera 212 by at least one of DMCC 210, DMCC 220 and DMCC 230. The permission response indicates that a permission exists to establish the direct connection between the first device 202 and the second device 212. The DMCC 210, 220, 230 may comprise a permission indication that is used as a trigger to find the permission response from the third device 222. Alternatively, the permission response from the third device may be considered a permission indication as will be described in further detail with reference to FIG. 7.

In step 2000, DMCC 210 receives a connection request. If DMCC 210 contains a permission response from the third device 222 as obtained in step 2103, the direct connection 2007 may be established without further ado. If not, the connection request may be routed to DMCC 220 (not shown) or DMCC 230 as shown in step 2008. In step 2009, DMCC 230 may find the permission response obtained in step 2013 and proceed with establishing the direct connection in steps 2012 and 2007 without (again) requiring a permission response from the third device 222 (i.e. steps 2010, 2011 may be omitted). Similar process steps would apply in case of routing to DMCC 220 instead of DMCC 230, where DMCC 220 finds the permission response (steps not shown).

Figure 4:
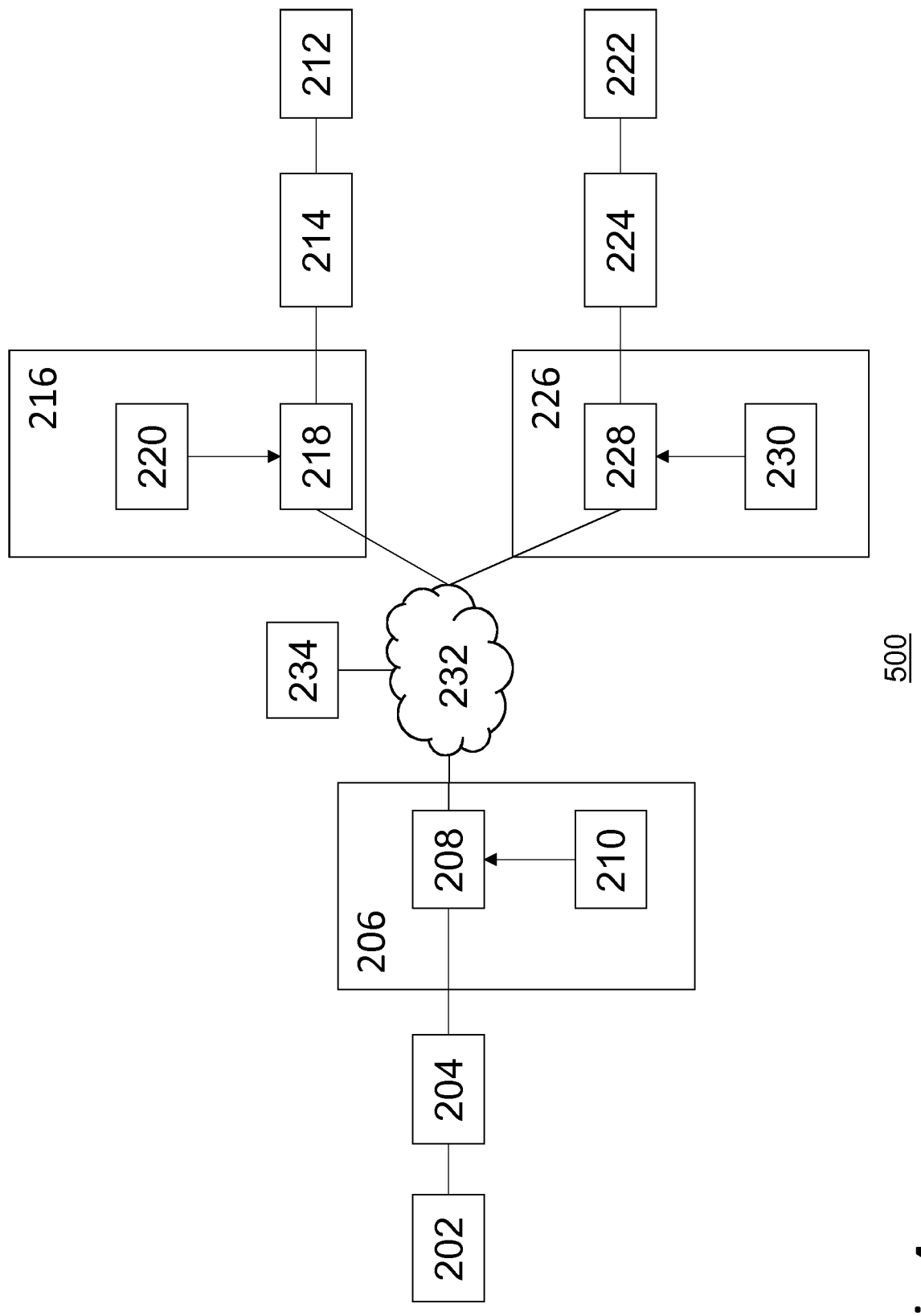
FIG. 4 shows a schematic illustration of a telecommunications system, according to one embodiment of the present invention.

FIG. 4 provides a schematic illustration of system 500 that enables establishment of a direct connection between a first device 202 and a second device 212, wherein device 212 is non-operable by a user. In system 500 a core network 206 having edge firewall 208, core network 216 comprises edge firewall 218 and core network 226 comprises edge firewall 228. The above description of edge firewalls 208 and 218 with reference to FIG. 2A is also applicable to edge firewall 228. System 500 furthermore comprises an OTT service provider 234 that is connected to the further network 232.

Figure 5:
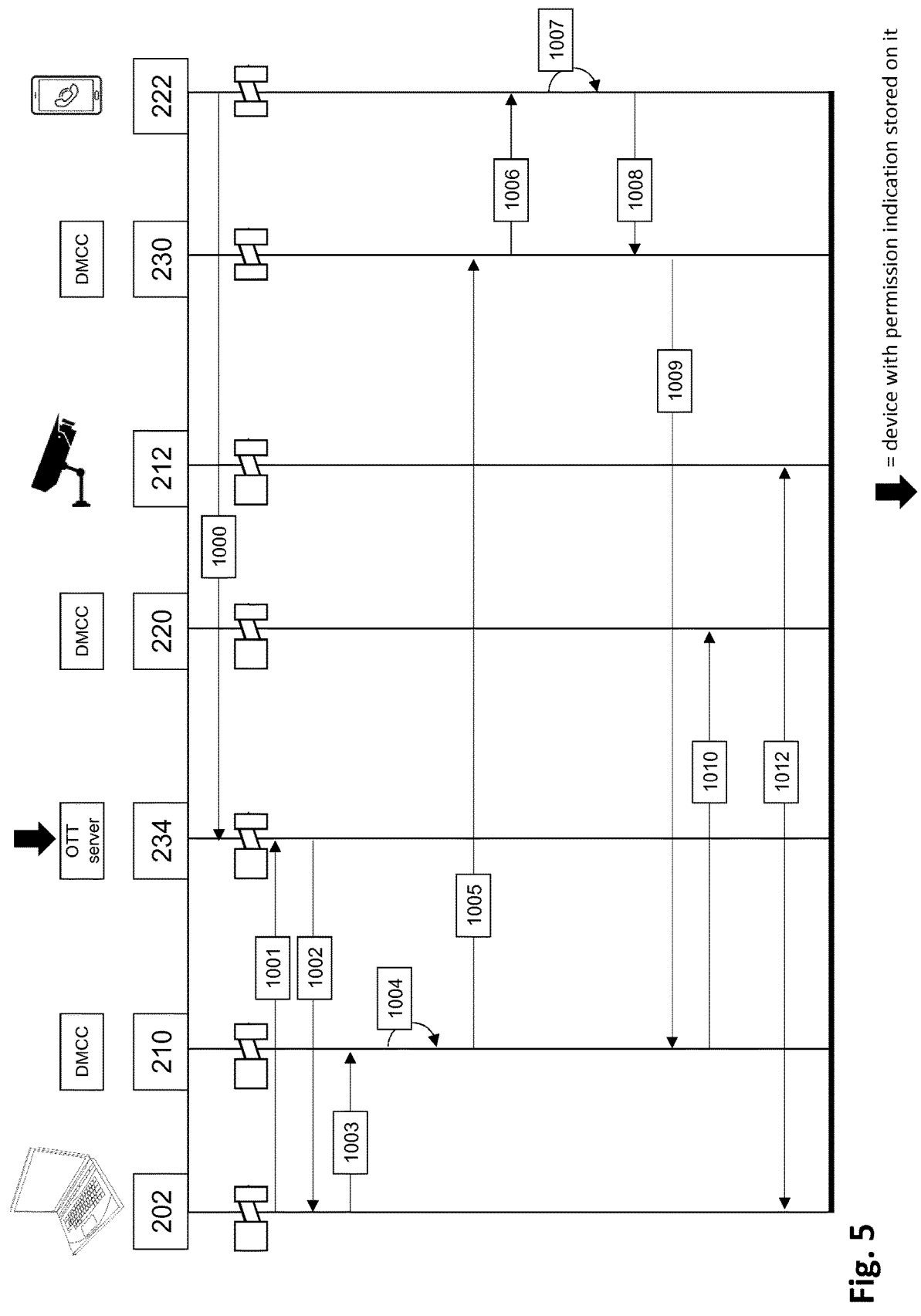
FIGS. 5-13 show message diagrams that enable establishment of a direct connection between a first device and a second device according to disclosed embodiments.

FIG. 5 illustrates a messaging diagram for a method of setting up a direct connection between devices 210 and 212 in system 500.

In the embodiment of FIG. 5, the ownership of the security camera 212 is registered prior to initiating the direct connection. In this example, in a first step 1000, the mobile phone registers with the OTT service 234 as a device owning the security camera 212. The message that is sent in step 1000 from mobile phone 222 to OTT server 234 comprises both an identifier of the mobile phone 222 and an identifier of the security camera 212. It may be that step 1000 was triggered when mobile phone 222 accessed a link to OTT service 234, wherein the link may be obtained from a QR code that came with the purchase of security camera 212, or through a close range radio channel such as Bluetooth. It may also be that the OTT service accepts the registration of mobile phone 222 as an owning device, based on an access code comprised in such link. Alternatively, the OTT service might accept the registration just because device 222 is the first to do so.

Note that the message sent in step 1000 may also comprise authentication information confirming that mobile phone 222 is a device owning security camera 212. Steps of obtaining this authentication information are not shown in FIG. 5.

In step 1001, the notebook computer 202 queries the OTT service 234 for an identifier of security camera 212. In response the notebook 202 receives from the OTT service 234 in step 1002 both the identifier of mobile phone 222 and the identifier of security camera 212. Subsequently in step 1003, the notebook 202 sends a connection request comprising the two received identifiers to DMCC 210. In step 1004, the DMCC 210 resolves the identifier of DMCC 230 in network 226 where the mobile phone 222 has a subscription. In step 1005, the DMCC 230 receives a connection request message from DMCC 210. The connection request message is formatted such that it comprises a data field with the identifier of the mobile phone 222 and a data field with the identifier of the security camera 212. The identifier of the security camera 212 in the connection request may be the permission indication indicating that a connection with the security camera 212 is subject to permission from the mobile phone 222. Subsequently in step 1006, the DMCC 230 sends a permission request to mobile phone 222. In step 1007 the mobile phone 222 determines whether permission for the direct connection between notebook 202 and security camera 212 will be granted or not. In this example we assume that this determination requires a user interaction with mobile phone 222, i.e. the user of mobile phone 222 decides whether or not the direct connection is permitted. In another embodiment this determination may not require a user interaction and may be based on a pre-programmed policy. In FIG. 5 permission is granted in step 1007 and the DMCC 230 receives in step 1008 a message from mobile phone 222 comprising the permission response. DMCC 230 then sends a message in step 1009 to DMCC 210 that the connection request is permitted and that it can initiate setup of the direct connection. In steps 1010 the DMCC 210 sends the permission response to DMCC 220 and in step 1012 a direct connection between notebook 202 and security camera 212 is set up.

Figure 6:
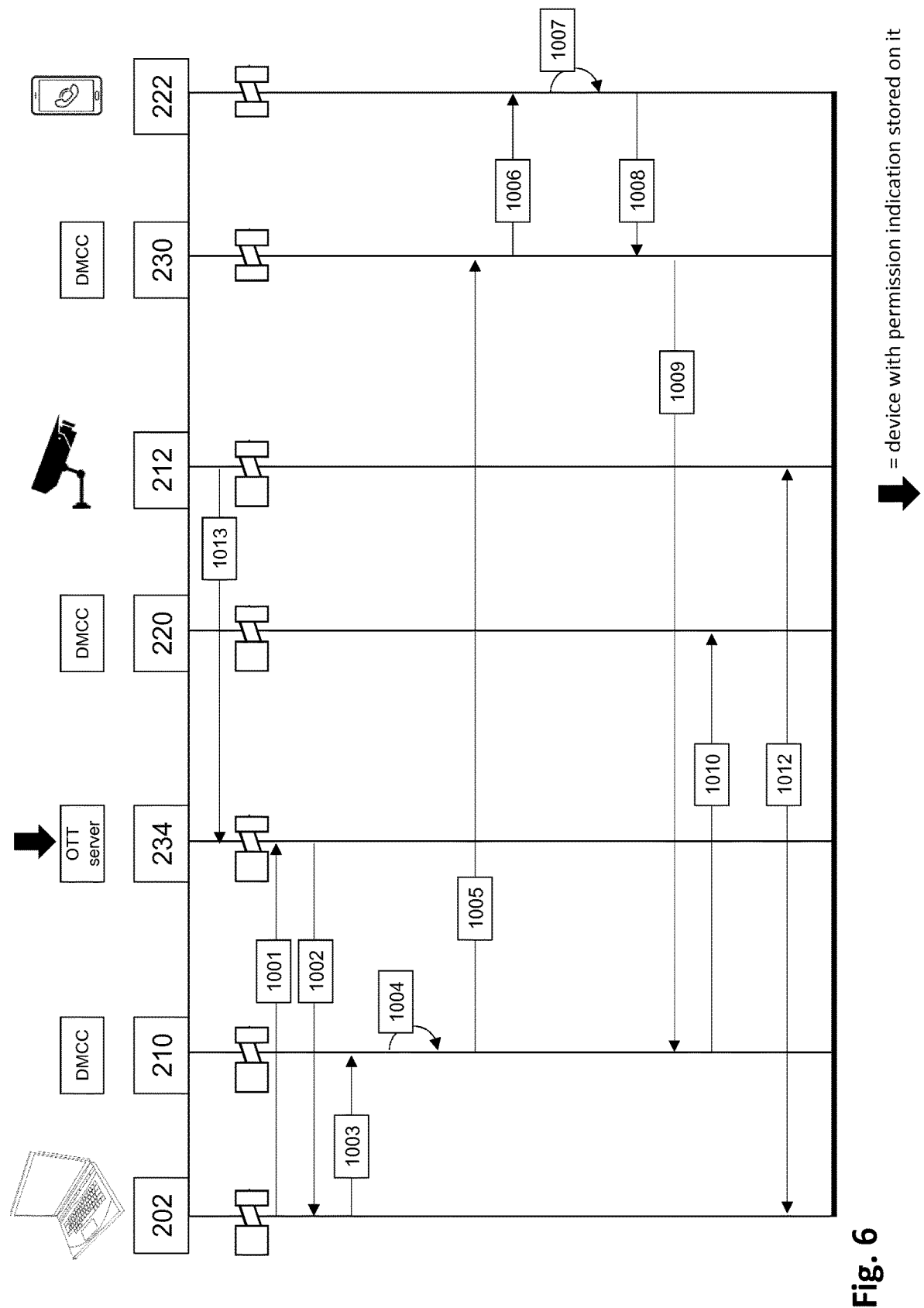

FIG. 6 illustrates the messaging diagram of another embodiment of the invention. Here the security camera 212 itself claims to be owned by mobile phone 222 at the OTT server 234 in step 1013. Further steps depicted in FIG. 6 have been described above with reference to FIG. 5.

Figure 7:
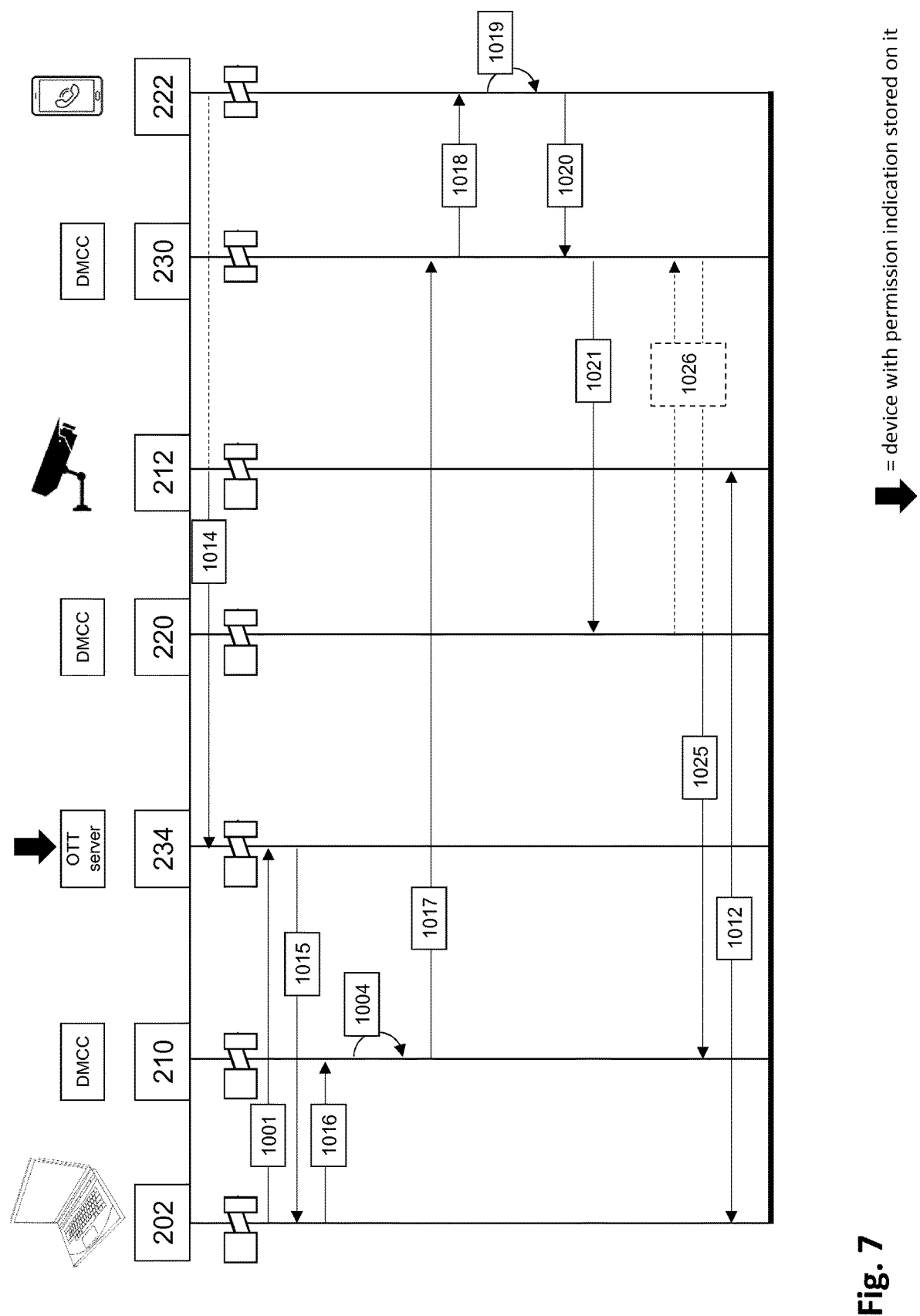

FIG. 7 illustrates a message diagram of yet another embodiment of the invention. In step 1014 either the mobile phone 222 or the security camera 212 registers the ownership by mobile phone 222 with the OTT service 234. In this embodiment in step 1014 an identifier of the mobile phone 222 is registered with the OTT service as the identifier for the security camera 212. An actual identifier of the security camera 212 need not be registered with the OTT service. In step 1001, again, the notebook 202 queries the OTT service for an identifier of security camera 212, similar to the embodiments of FIGS. 5 and 6. In response the notebook 202 receives from the OTT service 234 the registered identifier of mobile phone 222 in step 1015. In step 1016 the notebook sends a connection request to DMCC 210 comprising the identifier of mobile phone 222. Subsequently in step 1004 the DMCC 210 resolves the identifier of DMCC 230 in network 226 where the mobile phone 222 has a subscription. On the basis of this identifier, the DMCC 210 is informed to route the connection request to the DMCC 230. Subsequently, in step 1017 the DMCC 230 receives a connection request message from DMCC 210, wherein the connection request message comprises the identifier of mobile phone 222 in the third network. In step 1018, the DMCC 230 transmits a permission request to mobile phone 222. Subsequently, in step 1019 the mobile phone 222 determines that the connection request is not meant for mobile phone 222, but for security camera 212. This determination may be based on information about the security camera that is included in an information element of the connection request. The determination may also be based on the application that requests the permission for direct connection. For example, it may be that an application is installed on notebook 202 that is programmed to control security camera 212. The mobile phone 222 may recognize this application and determine that the connection request is meant for security camera 212. Alternatively it may even be that the user of mobile phone 222 is given the opportunity to determine for which device, either mobile phone 222 or security camera 212, the connection request is meant. One skilled in the art will appreciate that the list of devices might contain more options than just 212 and 222 and that this list might be stored locally, stored remotely and retrieved on demand by the phone and that this list might change based on which devices are on and available, etc. In such a case a user may determine that the request is meant for mobile phone 222, after which eventually a direct connection between mobile phone 222 and notebook 202 is established (not shown), wherein the direct connection for example enables notebook 202 to display a video stream recorded by the mobile phone 222, instead of a video stream recorded by the security camera 212. In step 1019, in addition to the determination that the permission request is meant for security camera 212, the mobile phone determines whether or not to grant permission. This may involve a user interaction or a pre-programmed policy as described for step 1007 in FIG. 5.

In this example the mobile phone grants the permission and in step 1020 the mobile phone 222 informs the DMCC 230 that the permission is granted and that the connection request should be sent to security camera 212. To this end, in step 1020 also the identifier of the security camera 212, which was stored in the mobile phone 222 or retrieved from a remote storage or even an OTT-service, is received by the DMCC 230. Note that the DMCC 230 only finds the permission indication at the moment it receives the permission response from mobile phone 222 in step 1020. The permission response may be regarded as the permission indication and the connection request message that is sent in step 1018 may be regarded as the permission request. Hence, in this embodiment the transmittal of a permission request occurs prior to finding the permission indication. DMCC 230 sends the permission response in step 1021 to DMCC 220. The DMCC 230 could choose to forward the message and include additional routing information, in case DMCC 220 is compatible with this solution. If not, the DMCC 230 could impersonate the originating DMCC 210 by forwarding the message and only changing the endpoint routing. In IP based networks the DMCC 230 would do this by replacing the originating IP address with its own IP address comparable to how NAT'ing firewalls work. In subsequent step 1025, the DMCC 220 sends an instruction to the DMCC 210 to establish the direct connection between notebook 202 and security camera 212. In order for 1025 to occur after step 1021, note that it is required that DMCC 230 includes an identification/routing information for DMCC 210 in message 1021. This information may be obtained e.g. from the source address in message 1017. This instruction is optionally routed through DMCC 230, indicated by optional step 1026, wherein DMCC 230 adds the routing information for DMCC 210. In step 1012 the direct connection is set up.

Figure 8:
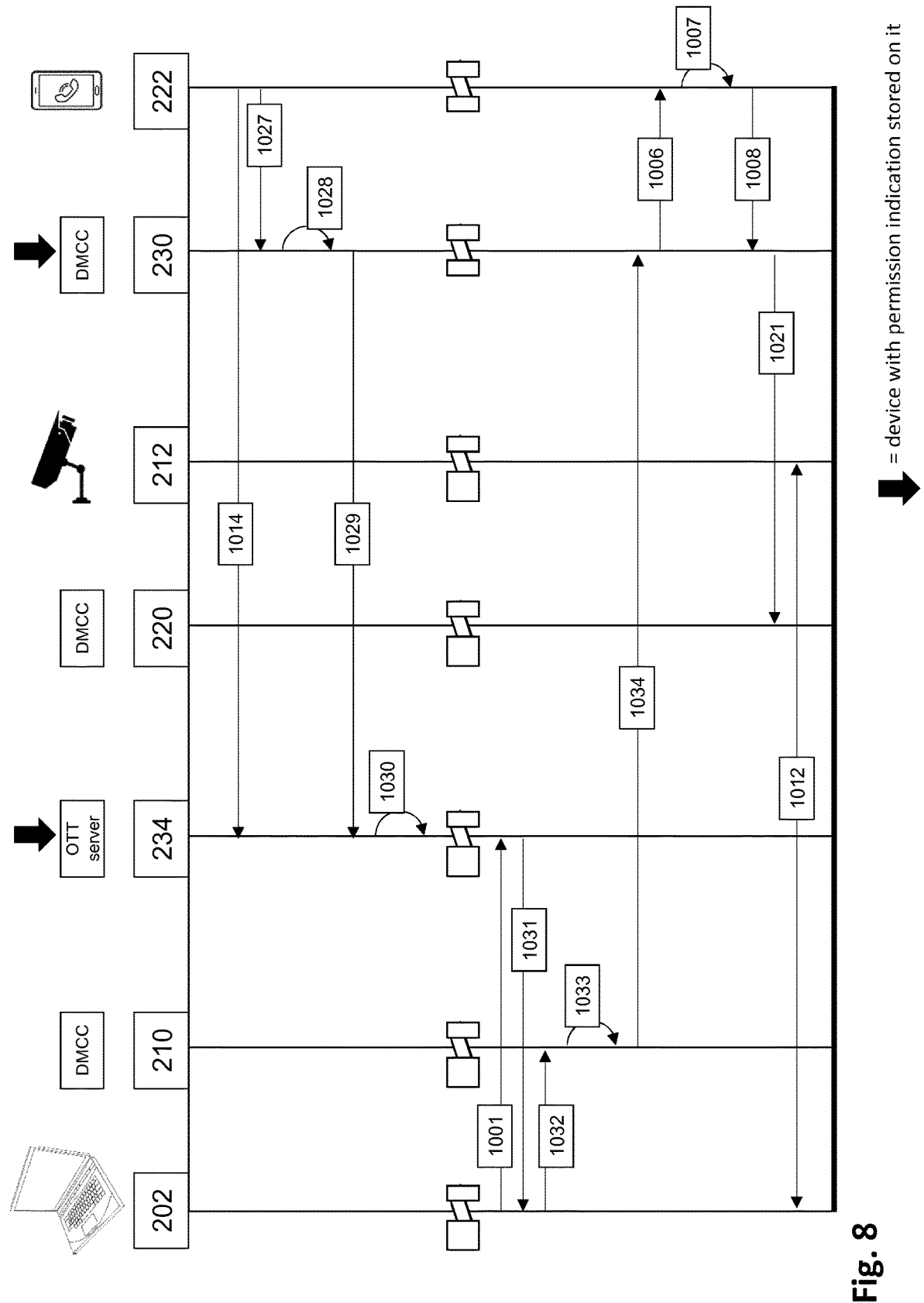

FIG. 8 illustrates a message diagram of yet another embodiment of the invention. In step 1014 the mobile phone 222 claims ownership of security camera 212 with the OTT server 234, similar to step 1014 described above with reference to FIG. 7. In this embodiment in step 1014 an identifier of the mobile phone 222 may be registered with the OTT service as the identifier for the security camera 212, but this is not required. DMCC 230 may also generate an identifier. In addition, the mobile phone 222 claims ownership of device 212 at DMCC 230 in step 1027. Again, authentication information may also be sent in steps 1014 and 1027 confirming that mobile phone 222 is indeed the owner of security camera 212. In step 1028, the DMCC 230 generates an identifier for security camera 212 in domain 226. In step 1029, DMCC 230 sends this MNO identifier to OTT service 234, that in step 1030 replaces the identifier that was stored in step 1014, with the MNO identifier generated by DMCC 230. In step 1001 the notebook 202 queries the OTT service 234 for an identifier of security camera 212. In response to this query the notebook 202 receives from the OTT service the MNO identifier of the security camera 212 for domain 226 of mobile phone 222. Subsequently the notebook 202 sends a connection request comprising this MNO identifier to DMCC 210, that resolves the MNO identifier to DMCC 230 in step 1033. DMCC 230 receives the connection request in step 1034. DMCC 230 asks mobile phone 222 for permission in steps 1006, 1007 and 1008 similar to these steps described with reference to FIG. 5. Subsequently, the DMCC 230 sends a message to DMCC 220 pretending to be DMCC 210 and requesting on behalf of device 202 in step 1021. DMCC 230 will now act as a relay between DMCC 210 and DMCC 220. In step 1012 the direct connection is set up.

Figure 9:
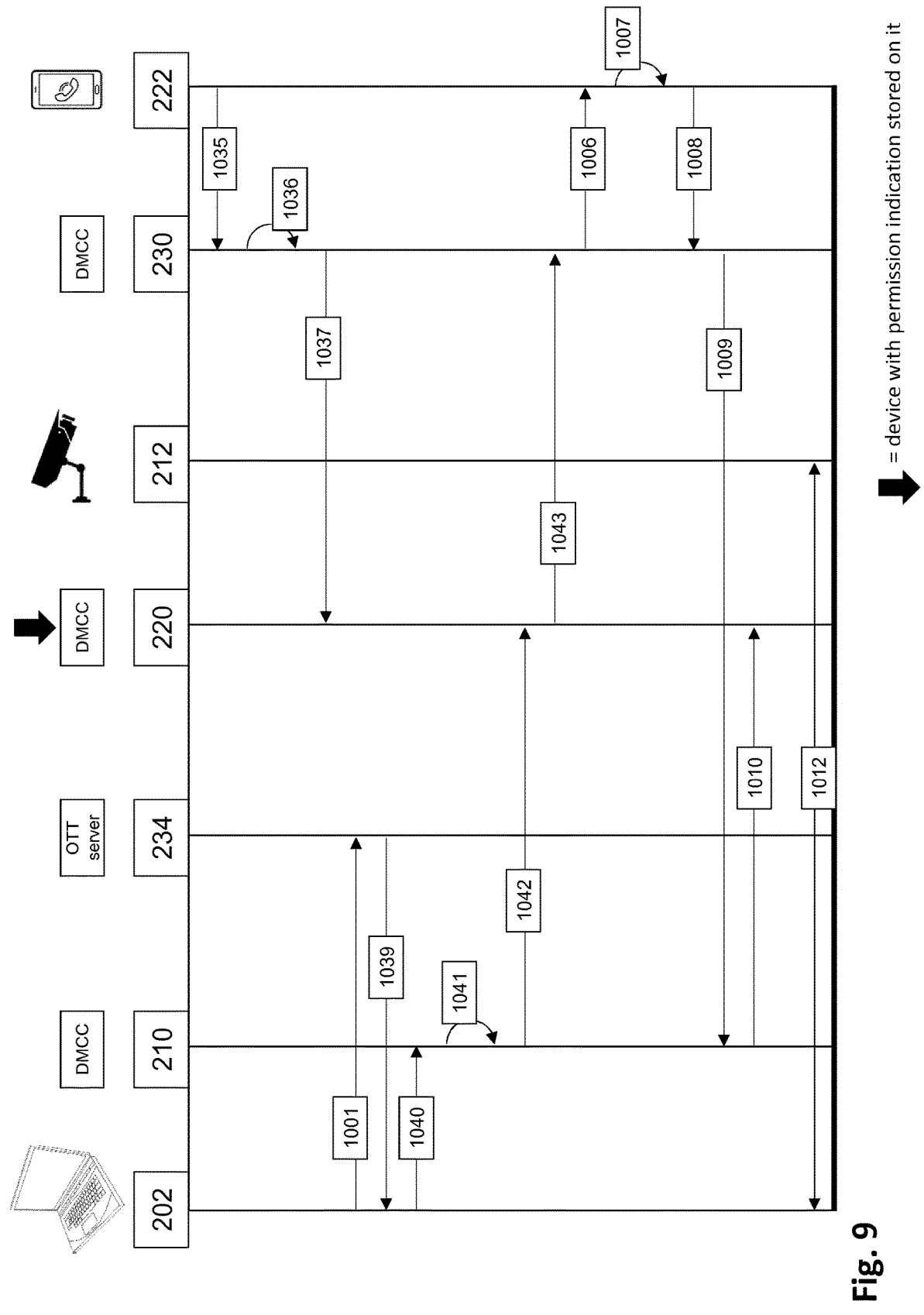

FIG. 9 shows a message diagram of another embodiment of the invention. In step 1035 DMCC 230 receives from mobile phone 222 a message that mobile phone 222 owns security camera 212. This message comprises an identifier of security camera 212 in the network 216 of the security camera 212. The identifier may be generated by DMCC 220 and may be transmitted from security camera 212 to mobile phone 222 over a direct connection (not shown). DMCC 230 generates in step 1036 an MNO identifier for device 212 in network 226 of the mobile phone 222 and in step 1037 messages the DMCC 220 that mobile phone 222 owns security camera 212 and thereby sends the identifier of security camera 212 in the network 216 to DMCC 220. In step 1001 the notebook 202 queries the OTT service 234 for an identifier of security camera 212 and receives in response in step 1039 the identifier of security camera 212 in the network 216. In step 1040 the notebook 202 sends a connection request comprising the identifier of security camera 212 in the network 216 to DMCC 210. DMCC 210 then resolves this identifier in step 1041 and sends as a result in step 1042 the connection request to DMCC 220. Because the ownership of the security camera 212 is registered at the DMCC 220, DMCC 220 sends a permission request in step 1043 to DMCC 230. DMCC 230 asks mobile phone for permission, and receives a permission response in steps 1006-1008 as described above. Next a direct connection is established in steps 1009-1012 as described above with reference to FIG. 5.

Figure 10:
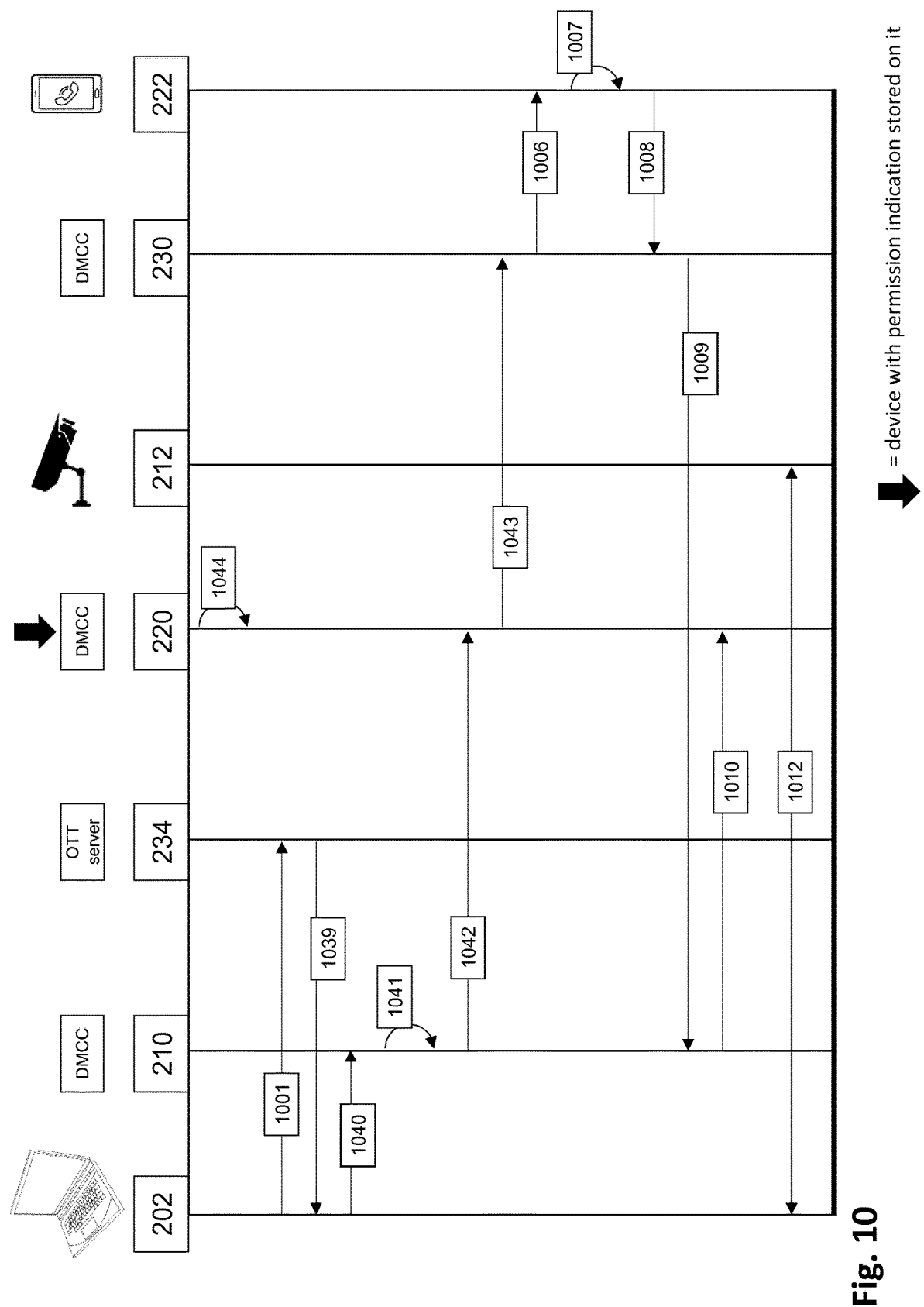

FIG. 10 is a message diagram of another embodiment of the invention. In this embodiment the owner of security camera 212 can configure ownership of the security camera 212 by adding mobile phone 222 to an ownership database. The ownership database may be accessible through a web service of the MNO for security camera 212. The web service may be indirectly configuring DMCC 220 in step 1044, or may even be a direct web interface on DMCC 220. The rest of the steps in FIG. 10 have been described with reference to FIG. 9.

Figure 11:
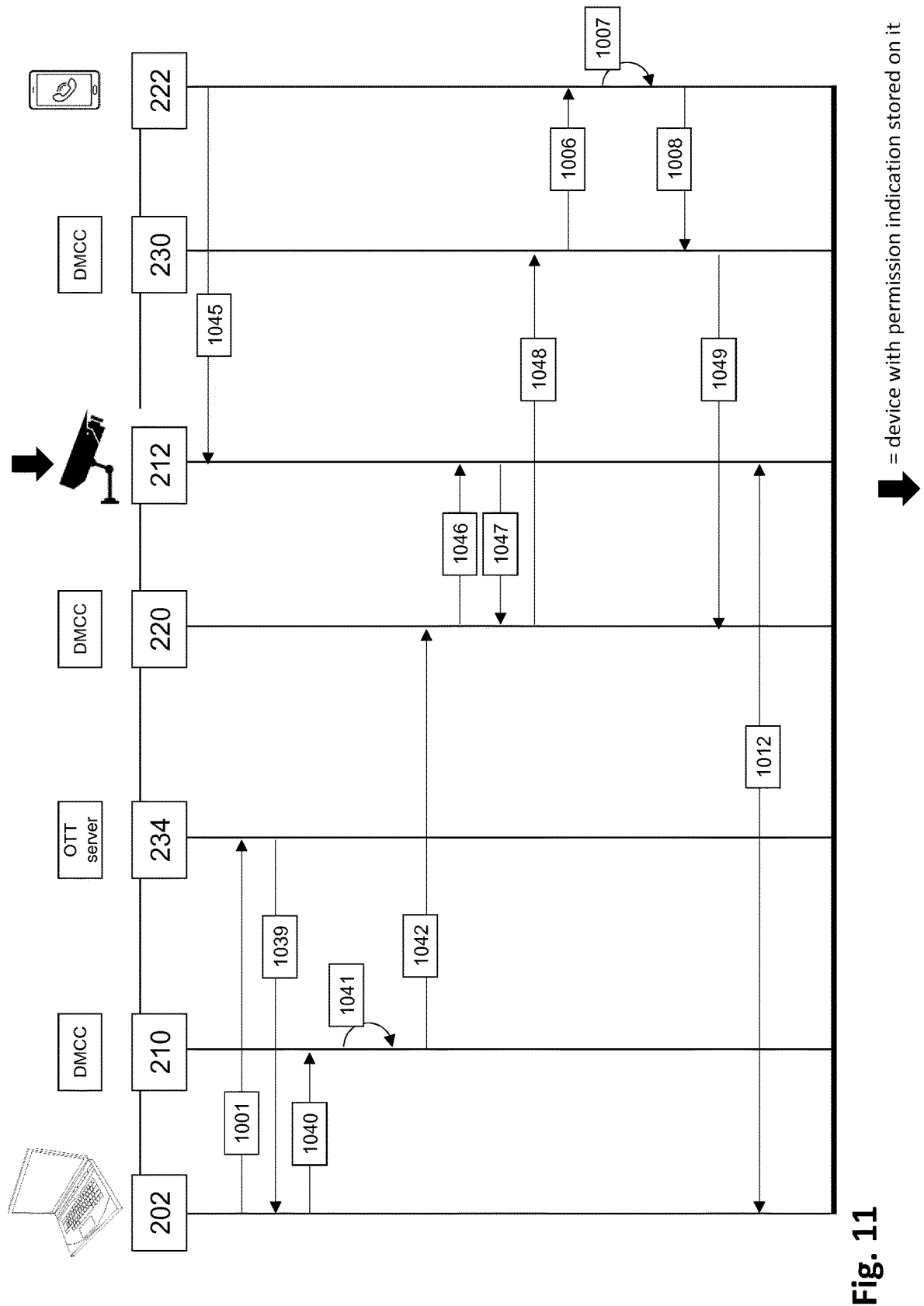

FIG. 11 is a message diagram of an embodiment of the invention. In step 1045 mobile phone 222 claims ownership of security camera 212. This could be done using a short range radio connection between the two devices (e.g. Bluetooth, wifi or NFC), or using an over the top mechanism that informs security camera 212 of the ownership by another device. Security camera 212 stores the identifier of mobile phone 222, which is also sent in step 1045. The subsequent steps 1001-1042 have been described above with reference to FIG. 9. Upon reception of the connection request at DMCC 220 in step 1042, DMCC 220 sends the connection request to security camera 212 in step 1046. Then, in step 1047, because the permission indication is registered at security camera 212, a permission request is routed in step 1048 to DMCC 230, which sends the permission request and receives permission response from mobile phone 222 following steps 1006-1008. In step 1049 the permission response is sent back to DMCC 220, after which the direct connection is set up in step 1012.

Figure 12:
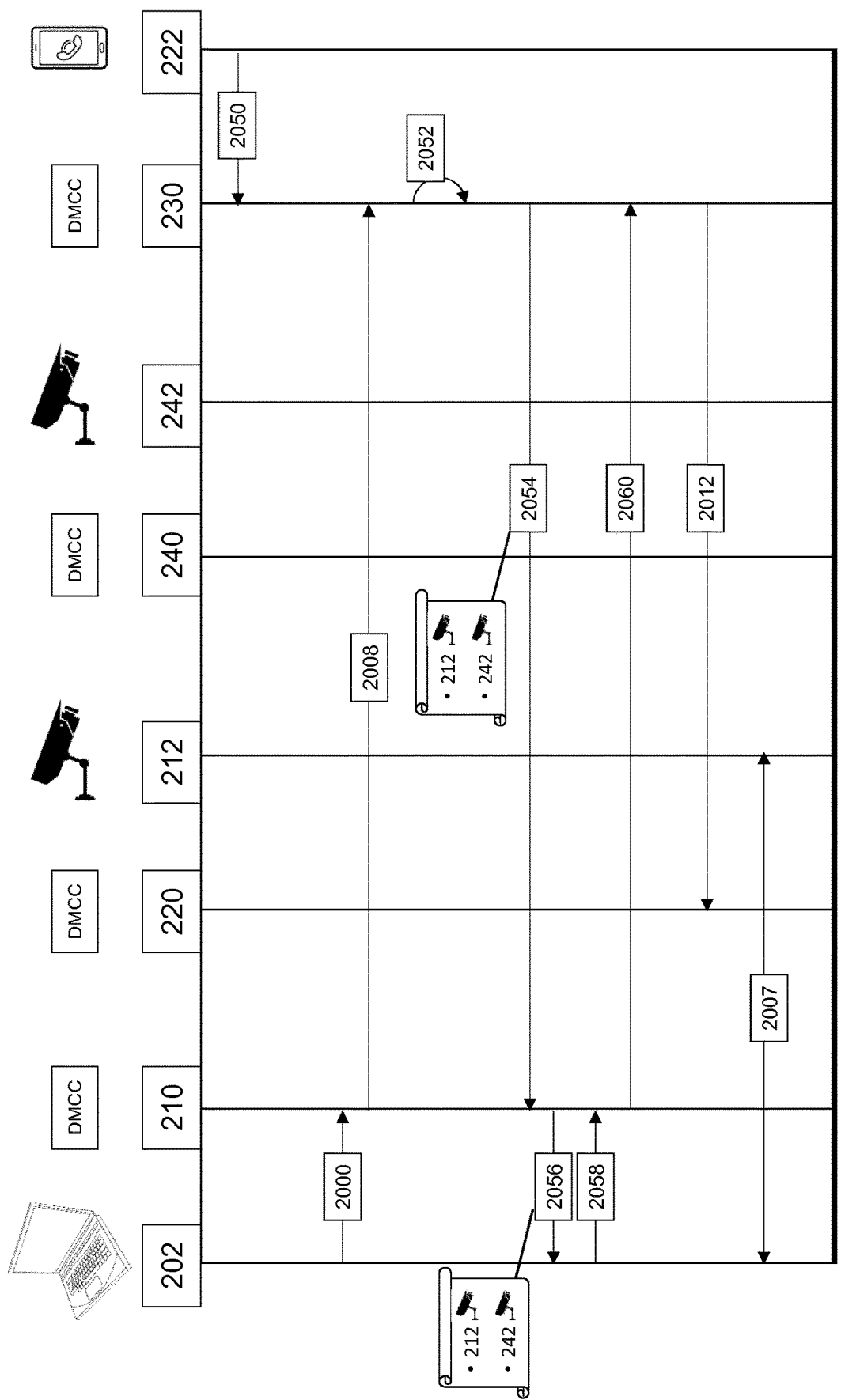

FIG. 12 is a message diagram of an embodiment of the invention. Similar to step 2013 described with reference to FIG. 3D, prior to receiving a connection request in step 2000, permission responses are received in step 2050 from the mobile device 222 owning security camera 212 and security camera 242 by at least one of DMCC 210, DMCC 220, DMCC 230 and DMCC 240. Note that in FIG. 12 the permission responses are only received by DMCC 230. The permission responses indicate that permissions exist to establish a direct connection between the first device 202 and the security camera 212 and to establish a direct connection between the first device 202 and the security camera 242.

In step 2000, DMCC 210 receives a connection request. Step 2000 includes an identifier for security camera 212, an identifier for security camera 242, or an identifier that can be resolved to both security camera 212 and security camera 242 by DMCC 230. The connection request may be routed to DMCC 230 as shown in step 2008. In step 2052, DMCC 230 may find the permission responses obtained in step 2050 and proceed with transmitting a list comprising an identifier of security camera 212 and an identifier of security camera 242 to the first device 202 in steps 2054 and 2056. In step 2058 DMCC 210 receives a selection message comprising an identifier of the security camera 212. In step 2060 DMCC 230 receives the selection message. Subsequently, in step 2012 and 2007, the direct connection between the first device 202 and the security camera 212 is established as described above.

Figure 13:
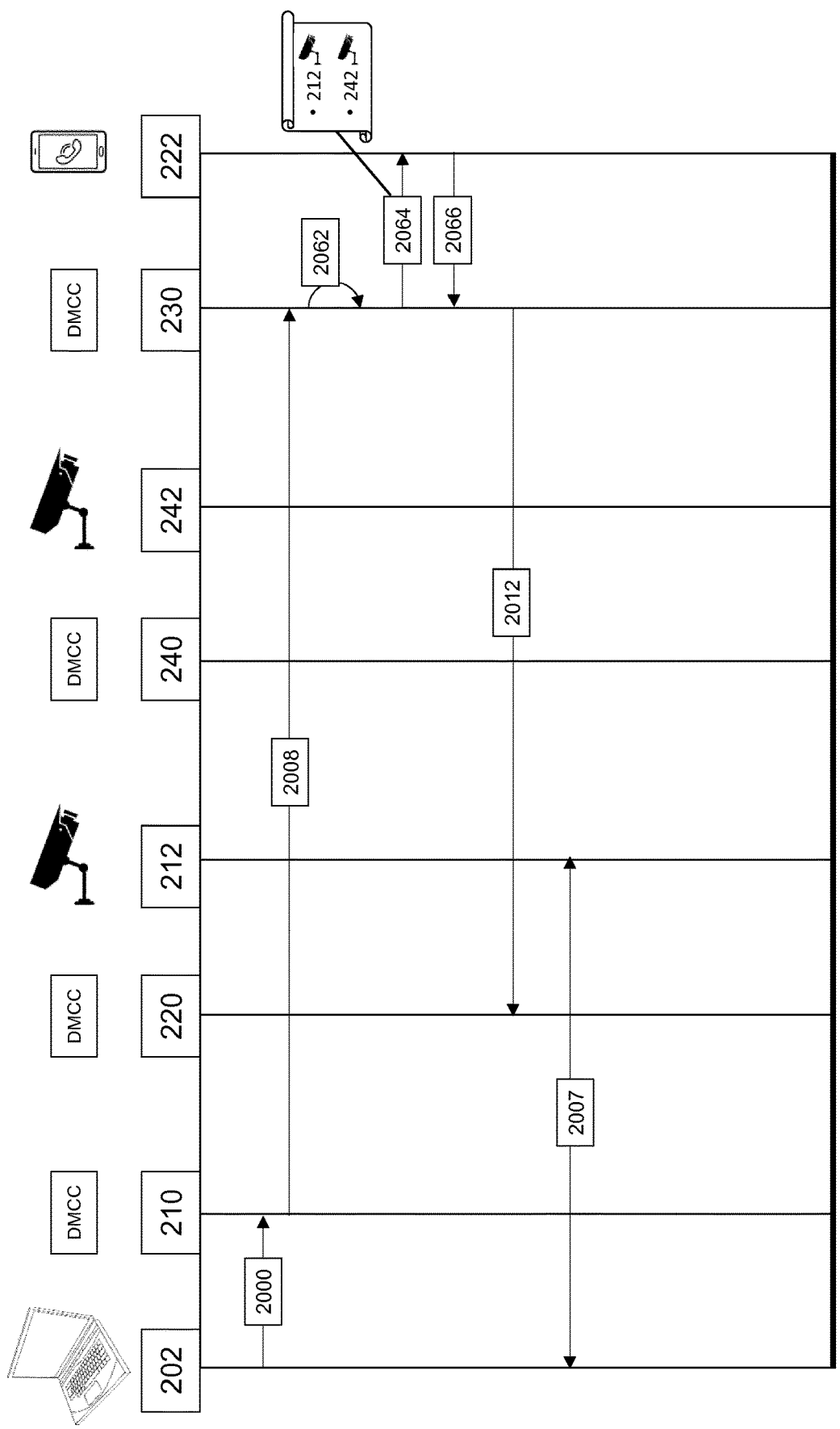

FIG. 13 is a message diagram of another embodiment of the invention. Step 2000 and 2008 have been described above with reference to FIG. 3C. Subsequently, in step 2062 DMCC 230 finds permission indications that connections with the security camera 212 and with security camera 242 are subject to permission from mobile phone 222, and sends in step 2064 a list comprising security cameras 212 and 242 to the mobile phone 222. In step 2066, the DMCC receives a selection message comprising an identifier of security camera 212. Note that the selection message may also comprise the permission response to permit the connection request for enabling establishing the direct connection between security camera 212 and first device 202. Steps 2012 and 2007 have been described above with reference to FIG. 3C.

Figure 14:
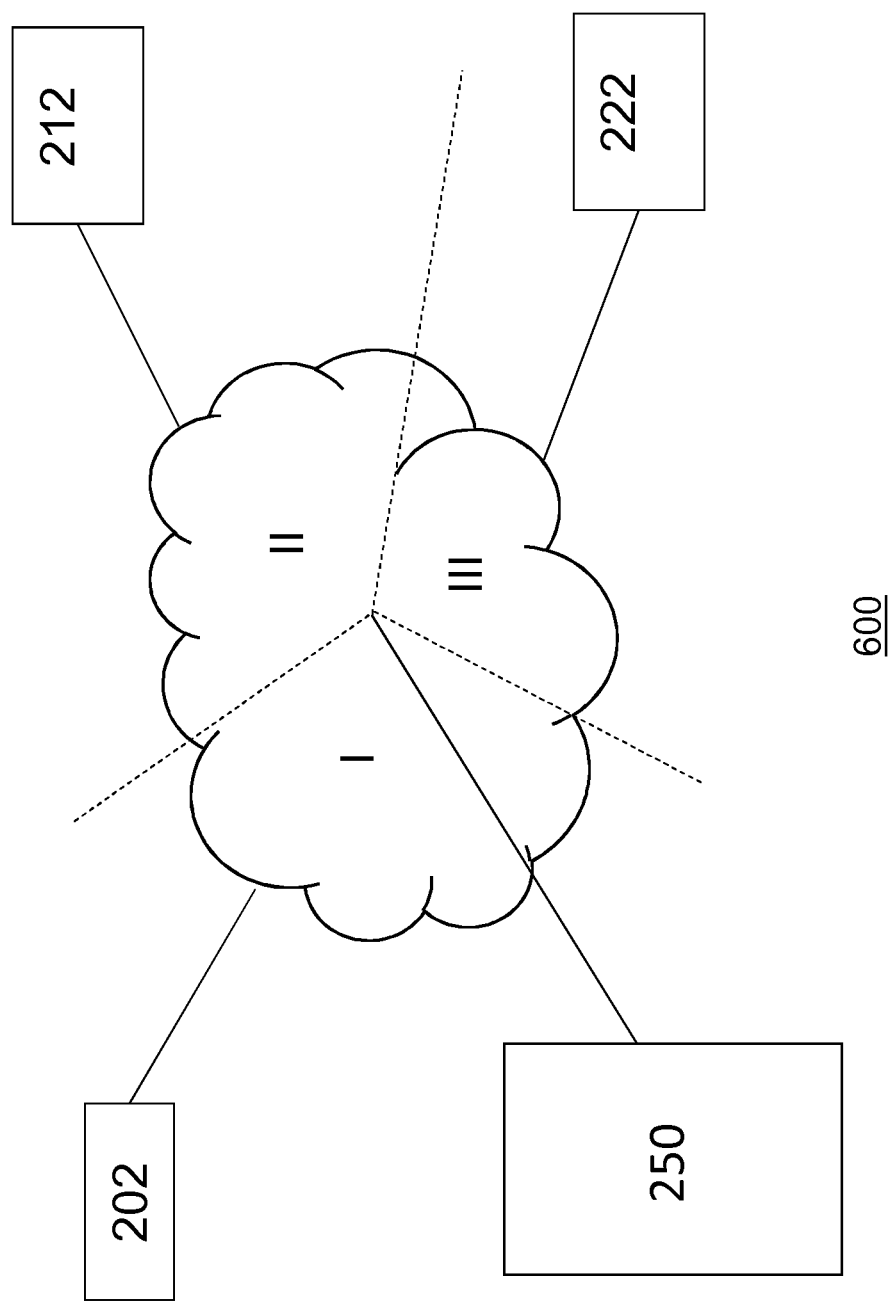
FIG. 14 provides a schematic illustration of a system for performing the method wherein the first network, the second network and the third network are network segments for a single operator.

FIG. 14 provides a schematic illustration of a network comprising a first network segment I, a second network segment II and a third network segment III to which the first device 202, the second device 212 and the third device 222 are connected respectively. Messaging between devices in network segments I, II, and III is similar to messaging in FIGS. 5-11 and is controlled by network node 250 which may comprise a DMCC. The network comprising segments I, II and III may comprise firewalls to be configured to enable establishment of a direct connection between device 202 and device 212 upon permission of device 222.

Figure 15:
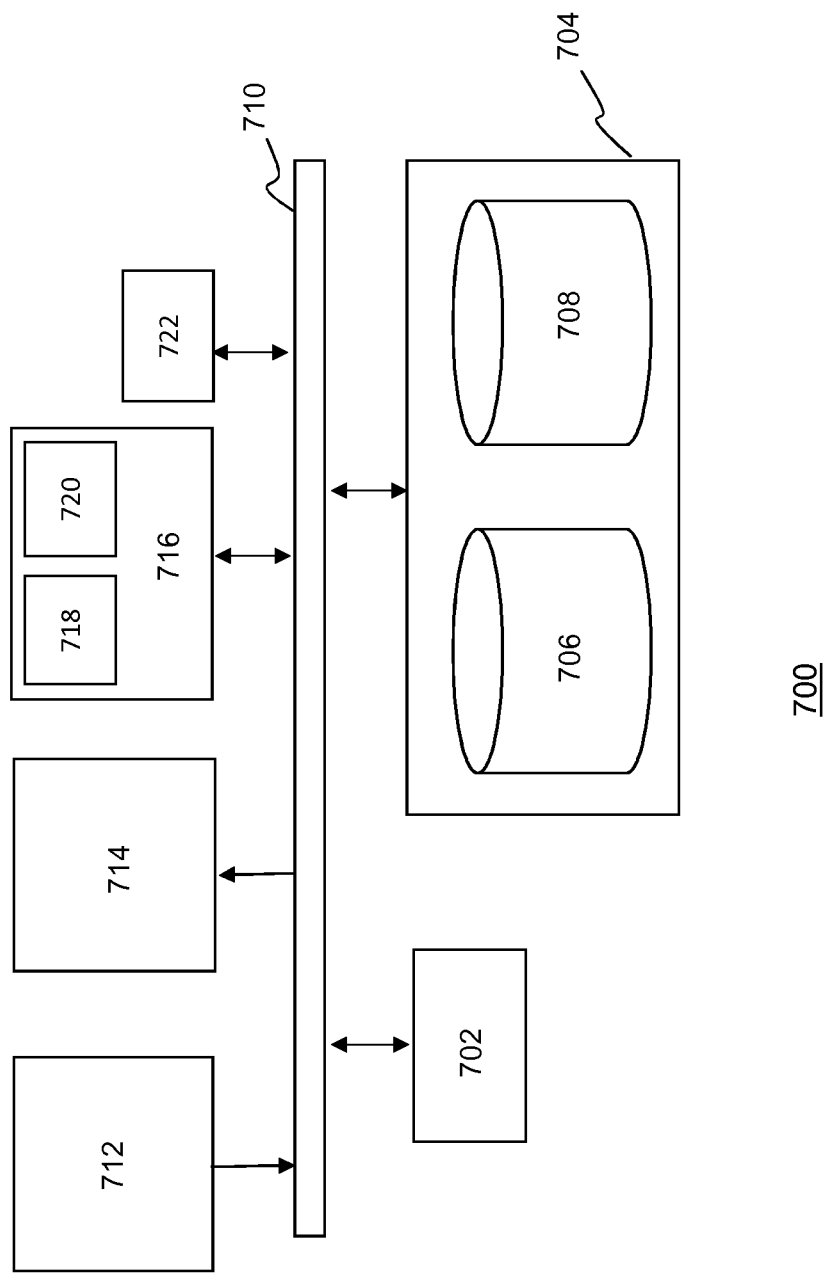
FIG. 15 shows a block diagram illustrating an exemplary data processing system that may be used in assisting in the establishment of an infrastructure-based D2D connection between the first and second devices according to embodiments of the present disclosure.

FIG. 15 shows a block diagram illustrating an exemplary data processing system 700 that may be used in assisting in establishing of an infrastructure-based D2D connection between the first and second devices according to embodiments of the present disclosure.

As shown in FIG. 15, the data processing system 700 may include at least one processor 702 coupled to memory elements 704 through a system bus 710. As such, the data processing system may store program code within memory elements 704. Further, the processor 702 may execute the program code accessed from the memory elements 704 via the system bus 710. In one aspect, the data processing system 700 may be implemented as a computer that is suitable for storing and/or executing program code. It should be appreciated, however, that the system 700 may be implemented in the form of any system including a processor and memory that is capable of performing the functions described within this specification.

The memory elements 704 may include one or more physical memory devices such as, for example, local memory 706 and one or more bulk storage devices 708. Local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 708 during execution.

Input/output (I/O) devices depicted as an input device 712 and an output device 714 optionally could be coupled to the data processing system. Examples of input device may include, but are not limited to, for example, a keyboard, a pointing device such as a mouse, or the like. Examples of output device may include, but are not limited to, for example, a monitor or display, speakers, or the like. The system 700 could also include a combined input/output device, e.g. in a form of a touch-sensitive (also referred to as a "touchscreen") display capable of displaying information and receiving user input in a form of user interaction with the display, possibly by means of a stylus or user's finger. Such an embodiment may be particularly useful if the data processing system 700 is configured to function as the UE 106 or a part thereof.

The input device and/or output device(s) may be coupled to data processing system either directly or through intervening I/O controllers.

A network adapter 716 may also be coupled to data processing system to enable it to become coupled to other systems, computer systems, remote network devices, and/or remote storage devices through intervening private or public networks. The network adapter may, in particular, comprise a data receiver 718 for receiving data that is transmitted by said systems, devices and/or networks to said data and a data transmitter 720 for transmitting data to said systems, devices and/or networks. Modems, cable modems, and Ethernet cards are examples of different types of network adapter that may be used with the data processing system 700.

The memory elements 704 may store an application (not shown). It should be appreciated that the data processing system 700 may further execute an operating system (not shown) that can facilitate execution of the application. The application, being implemented in the form of executable program code, can be executed by the data processing system 700, e.g., by the processor 702. Responsive to executing the application, the data processing system 700 may be configured to perform one or more method steps described herein, e.g. as the DMCC 210, the DMCC 220, the first device 202 or the second device 212.

Persons skilled in the art will recognize that while the elements 702-720 are shown in FIG. 15 as separate elements, in other embodiments their functionality could be implemented in lesser number of individual elements or distributed over a larger number of components.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for enabling establishment of a direct connection between a first mobile device connected to a first mobile network and a second mobile device connected to a second mobile network upon finding a permission response from a third mobile device connected to a third mobile network, wherein establishment of the direct connection is controlled by at least a second network node in a core of the second mobile network by configuring at least one firewall, protecting at least one of the first mobile device of the second mobile device, for a data exchange between the first mobile device and the second mobile device over the first mobile network and the second mobile network, a user being an owner of both the second mobile device and the third mobile device, and wherein the second mobile device is a non-operable device being not operable by the user, the method comprising:
   receiving a connection request from the first mobile device in the first mobile network at the second network node, wherein the second network node stores a permission indication;
   finding the permission indication indicating that a connection with the second mobile device is subject to authorization by the user from the third mobile device;
   upon finding the permission indication at the second network node and in response to receiving the connection request, transmitting a permission request from the second network node via a third network node in a core of the third mobile network to the third mobile device;
   receiving the permission response from the third mobile device at the second network node from the third network node to permit the connection request for enabling establishment of the direct connection; and
   enabling establishing the direct connection between the first mobile device and the second mobile device in response to finding the permission response.

2. The method according to claim 1, wherein the second mobile device is one of a plurality of devices, wherein for each device in the plurality of devices a permission indication and a permission response is found, and wherein the method further comprises:
   prior to enabling the direct connection, transmitting a list comprising the plurality of devices to the first mobile device; and
   prior to enabling the direct connection, receiving a selection message comprising an identifier of the second mobile device from the first mobile device; and
   prior to enabling the direct connection, establishing the direct connection between the first mobile device and the second mobile device on the basis of the identifier.

3. The method according to claim 1, wherein the second mobile device is one of a plurality of mobile devices, wherein for each device in the plurality of mobile devices a permission indication is found, the method further comprising:
   transmitting a list comprising the plurality of mobile devices to the third mobile device;
   receiving a selection message comprising an identifier of the second mobile device from the third mobile device; and
   establishing the direct connection between the first mobile device and the second mobile device on the basis of the identifier.

4. The method according to claim 1, wherein a first network node is associated with the first mobile network, and wherein at least one of the first network node, the second network node and the third network node enables establishment of the direct connection between the first mobile device and the second mobile device by configuring the at least one firewall, protecting at least one of the first mobile device or the second mobile device, for the data exchange between the first mobile device and the second mobile device over the first mobile network and the second mobile network.

5. The method according to claim 1, wherein a first network node is associated with the first mobile network, and wherein the connection request is received from the first network node, the method further comprising:
   at the third network node, recognizing information in the connection request from the first network node indicative of the permission indication;
   at the third network node, transmitting the permission request to the third mobile device in response to receiving the connection request upon finding the permission indication; and
   at the third network node, instructing at least one of the first network node and the second network node to enable establishment of the direct connection between the first mobile device and the second mobile device in response to receiving the permission response from the third mobile device.

6. The method according to claim 5, wherein the information in the connection request indicative of the permission indication involves an identifier, the identifier being at least one of:
the second mobile device in the second mobile network; or
the second mobile device in the third mobile network.

7. The method according to claim 5, further comprising:
at the first network node, receiving the instruction to enable establishment of the direct connection from the third network node; and
at the first network node, transmitting the connection request to the second network node in response to receiving the instruction from the third network node.

8. The method according to claim 1, further comprising storing the permission indication in the second network node in response to at least one of: an instruction from the third mobile device via the third network node, or using a web service associated with the second network node.

9. The method according to claim 8, wherein the permission indication comprises an identifier of the second mobile device in the third mobile network generated by the third network node.

10. The method according to claim 1, wherein the third network node operates as a relay node between the first mobile device and the second network node during the existence of the direct connection between the first mobile device and the second mobile device.

11. The method according to claim 10, further comprising:
receiving a termination signal at the third network node from the third mobile device; and
terminating the direct connection between the first mobile device and the second mobile device at the third network node in response to receiving the termination signal.

12. The method according to claim 1, wherein the connection request is received at the second mobile device, and wherein the establishment of the direct connection is enabled at the second mobile device, the method further comprising:
at the second mobile device, transmitting the permission request to the second network node upon finding the permission indication stored in the second mobile device; and
at the second mobile device, receiving the permission response of the third mobile device from the second network node.

13. A non-transitory computer readable medium having instructions stored thereon that, when executed by one or more processors of a system for enabling establishment of a direct connection between a first mobile device connected to a first mobile network and a second mobile device connected to a second mobile network upon finding a permission response from a third mobile device connected to a third mobile network, wherein establishment of the direct connection is controlled by at least a second network node in a core of the second mobile network by configuring at least one firewall, protecting at least one of the first mobile device or the second mobile device, for a data exchange between the first mobile device and the second mobile device over the first mobile network and the second mobile network, a user being an owner of both the second mobile device and the third mobile device, and wherein the second mobile device is a non-operable device being not operable by the user, cause the system to carry out operations including:
receiving a connection request from the first mobile device in the first mobile network at at least one of the second network, wherein the second network node stores a permission indication;
finding the permission indication indicating that a connection with the second mobile device is subject to authorization by the user from the third mobile device;
upon finding the permission indication at the second network node and in response to receiving the connection request, transmitting a permission request from the second network node via a third network node in a core of the third mobile network to the third mobile device;
receiving the permission response from the third mobile device at the second network node from the third network node to permit the connection request for enabling establishment of the direct connection; and
enabling establishing the direct connection between the first mobile device and the second mobile device in response to finding the permission response.

14. A network node in a core of a given telecommunications network, the network node configured for controlling establishment of a direct connection between a first mobile device connected to a first mobile network and a second mobile device connected to a second mobile network upon finding a permission response from a third mobile device connected to a third mobile network, wherein at least one firewall is configured, protecting at least one of the first mobile device or the second mobile device, for a data exchange between the first mobile device and the second mobile device over the first mobile network and the second mobile network, a user being an owner of both the second mobile device and the third mobile device, and wherein the second mobile device is a non-operable device being not operable by the user, the network node comprising:
a processor and memory storing instructions that, when executed by the processor, cause the network node to carry out operations including:
receiving a connection request from the first mobile device in the first mobile network, wherein the network node stores a permission indication;
finding the permission indication indicating that a connection with the second mobile device is subject to authorization by the user from the third mobile device;
upon finding the permission indication and in response to receiving the connection request, transmitting a permission request to the third mobile device;
receiving the permission response from the third mobile device to permit the connection request for enabling establishment of the direct connection; and
enabling establishing the direct connection between the first mobile device and the second mobile device in response to finding the permission response.

15. A user device configured for being directly connected to a first mobile device connected to a first mobile network, wherein the user device lacks a user interface for responding to a connection request, wherein the user device is connected to a second mobile network, wherein establishment of a direct connection between the user device and the first mobile device is controlled by at least a second network node in a core of the second mobile network by configuring at least one firewall, protecting at least one of the first mobile device or the user device, for a data exchange between the first mobile device and the user device over the first mobile network and the second mobile network, wherein a user is an owner of the user device, the user device comprising:

a processor and memory storing instructions that, when executed by the processor, cause the user device to carry out operations including engaging in a direct connection to the first mobile device, wherein a connection request is received from the first mobile device in the first mobile network at the second network node, wherein the second network node stores a permission indication, wherein the permission indication is found, the permission indication indicating that a connection with the user device is subject to authorization by the user from a third mobile device connected to a third mobile network, wherein the user also owns the third mobile device, upon finding the permission indication at the second network node and in response to receiving the connection request, a permission request is transmitted from the second network node via a third network node in a core of the third mobile network to the third mobile device;

wherein the permission response from the third mobile device is received at the second network node from the third network node to permit the connection request for enabling establishment of the direct connection; and and wherein establishment of the direct connection between the first mobile device and the user device is enabled in response to finding the permission response.

16. A user device that is a mobile device and is configured for participating in enabling establishment of a direct connection between a first mobile device connected to a first mobile network and a second mobile device connected to a second mobile network upon finding a permission response from the user device, wherein establishment of the direct connection is controlled by at least a second network node in a core of the second mobile network by configuring at least one firewall, protecting at least one of the first mobile device or the second mobile device, for a data exchange between the first mobile device and the second mobile device over the first mobile network and the second mobile network, a user being an owner of both the second mobile device and the user device, and wherein the second mobile device is a non-operable device being not operable by the user, wherein the user device is connected to a third mobile network, the user device comprising:

a processor and memory storing instructions that, when executed by the processor, cause the user device to carry out operations including:

transmitting a permission response in response to detecting a permission request, wherein a connection request is received by the device from the first mobile device in the first network at the second network node associated with the second mobile network and via a third network node in a core of the third mobile network, wherein a permission indication is found, the permission indication indicating that a connection with the user device is subject to authorization by the user from the user device, wherein the transmitted permission response from the user device is found, the permission response permitting the connection request for enabling establishment of the direct connection, and wherein establishment of the direct connection between the first mobile device and the second mobile device is enabled in response to finding the transmitted permission response.

17. The network node of claim 14, wherein the network node is or comprises a direct mode control center (DMCC), and wherein receiving the connection request from the first mobile device in the first mobile network comprises receiving the connection request at the network node in the core of the given network with which the network node is associated, wherein the given network is at least one of the second mobile network or the third mobile network.

18. The user device of claim 15, wherein the user device comprises a storage device storing the permission indication, and wherein the operations further include transmitting the permission request upon finding the permission indication.

* * * * *